(12) United States Patent
Shi et al.

(10) Patent No.: US 12,191,963 B2
(45) Date of Patent: Jan. 7, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 394 days.

(21) Appl. No.: 17/576,672

(22) Filed: Jan. 14, 2022

(65) Prior Publication Data
US 2022/0140884 A1    May 5, 2022

Related U.S. Application Data

(63) Continuation of application No. PCT/CN2019/096426, filed on Jul. 17, 2019.

(51) Int. Cl.
| | |
|---|---|
| *H04W 52/02* | (2009.01) |
| *H04B 7/06* | (2006.01) |
| *H04W 24/10* | (2009.01) |
| *H04W 76/19* | (2018.01) |
| *H04W 80/02* | (2009.01) |

(52) U.S. Cl.
CPC .......... *H04B 7/0695* (2013.01); *H04W 24/10* (2013.01); *H04W 76/19* (2018.02); *H04W 80/02* (2013.01)

(58) Field of Classification Search
CPC ..... H04W 76/19; H04W 76/18; H04W 76/10; H04W 80/02; H04W 80/00; H04W 24/10; H04B 7/0695; H04B 7/06952
See application file for complete search history.

(56) References Cited

U.S. PATENT DOCUMENTS

| 2019/0281480 A1* | 9/2019 | Wei | H04W 76/19 |
|---|---|---|---|
| 2020/0052769 A1* | 2/2020 | Cirik | H04L 5/0094 |
| 2020/0266876 A1* | 8/2020 | Yu | H04B 7/0639 |
| 2020/0389222 A1* | 12/2020 | Wu | H04W 72/046 |
| 2021/0013949 A1* | 1/2021 | Agiwal | H04W 80/02 |

(Continued)

FOREIGN PATENT DOCUMENTS

| CN | 109391399 A | 2/2019 |
|---|---|---|
| CN | 110022565 A | 7/2019 |

(Continued)

OTHER PUBLICATIONS

Extended European Search Report issued in corresponding European application No. 19937843.1, mailed Jun. 30, 2022.

(Continued)

*Primary Examiner* — Phong La
(74) *Attorney, Agent, or Firm* — BAYES PLLC

(57) ABSTRACT

A wireless communication method, a terminal device and a network device. The method includes canceling or suspending, by a terminal device, an operation of Beam Failure Recovery (BFR) corresponding to a first secondary cell in response to deactivation of the first secondary cell.

15 Claims, 3 Drawing Sheets

300

Start an operation of Beam Failure Recovery (BFR) corresponding to a first secondary cell or continue a suspended operation of the BFR corresponding to the first secondary cell by a terminal device in response to activation of the first secondary cell — S310

(56) References Cited

U.S. PATENT DOCUMENTS

2021/0013951 A1* 1/2021 Chen ............... H04W 48/20
2022/0140884 A1* 5/2022 Shi ................. H04W 76/19
                                                    370/329
2022/0321193 A1* 10/2022 Uchino ............ H04W 24/04

FOREIGN PATENT DOCUMENTS

| CN | 110022613 A | | 7/2019 | |
|---|---|---|---|---|
| CN | 111937437 A | * | 11/2020 | ............ H04B 7/022 |
| WO | 2019028736 A1 | | 2/2019 | |
| WO | 2019029667 A1 | | 2/2019 | |
| WO | 2019032882 A1 | | 2/2019 | |
| WO | WO-2019179514 A1 | * | 9/2019 | ........... H04B 7/0408 |

OTHER PUBLICATIONS

First Office Action issued in corresponding Indian application No. 202227008217, mailed Jul. 5, 2022.
Vivo, "Discussion on the SCell BFR", R2-1804696, 3GPP TSG-RAN WG2 Meeting #101bis Sanya, China, Apr. 16-Apr. 20, 2018.
Priority Review issued in corresponding Chinese application No. 202210157745.3, mailed Mar. 27, 2023.
International Search Report issued in corresponding International Application No. PCT/CN2019/096426, mailed Apr. 8, 2020, 41 pages.
Written Opinion of the International Searching Authority issued in corresponding International Application No. PCT/CN2019/096426, mailed Apr. 8, 2020, 12 pages.
"3rd Generation Partnership Project; Technical Specification Group Radio Access Network; NR; Medium Access Control (MAC) protocol specification (Release 15)", 3GPP TS 38.321 V15.5.0 (Mar. 2019), 77 pages.
"Discussion on Multi-beam Operation Enhancements", Agenda Item: 7.2.8.3, Source: OPPO, 3GPP TSG RAN WG1 Meeting #94bis, R1-1810970, Chengdu, China, Oct. 8-12, 2018, 5 pages.
3rd Generation Partnership Project; "Technical Specification Group Radio Access Network; NR; Radio Resource Control (RRC) protocol specification (Release 15)", 3GPP TS 38.331 V15.5.1 (Apr. 2019), 489 pages.
"Beam Failure Recovery on SCell", Agenda Item: 10.3.1.4.2, Source: ITL, 3GPP TSG-RAN WG2 Meeting #101bis R2-1806120, Sanya, China, Apr. 16-20, 2018, 5 pages.
"3rd Generation Partnership Project; Technical Specification Group Radio Access Network; NR; Physical layer procedures for control (Release 15)", 3GPP TS 38.213 V15.5.0 (Mar. 2019), 104 pages.
First Office Action issued in corresponding Chinese application No. 202210157745.3, mailed Apr. 19, 2023.
First Office Action issued in corresponding Japanese application No. 2022-502617, mailed Apr. 21, 2023.
Notice of Allowance issued in corresponding European application No. 19937843.1, mailed Apr. 28, 2023.
First Office Action issued in corresponding Korean application No. 10-2022-7005285, mailed Jun. 15, 2023.
OPPO, "Discussion on Multi-beam Operation Enhancements", R1-1902704, 3GPP TSG RAN WG1 #96, Athens, Greece, Feb. 25-Mar. 1, 2019.
Huawei et al., "Discussion on beam failure recovery for SCell", R2-1807975, 3GPP TSG-RAN WG2 Meeting 102 Busan, Korea, May 21-May 25, 2018.
ITL, "Beam Failure Recovery on SCell", R2-1808658, 3GPP TSG-RAN WG2 Meeting #102 Busan, Korea, May 21-May 25, 2018.
3GPP TS 38.321 V15.6.0 (Jun. 2019) Technical Specification Group Radio Access Network; NR; Medium Access Control (MAC) protocol specification (Release 15).

* cited by examiner

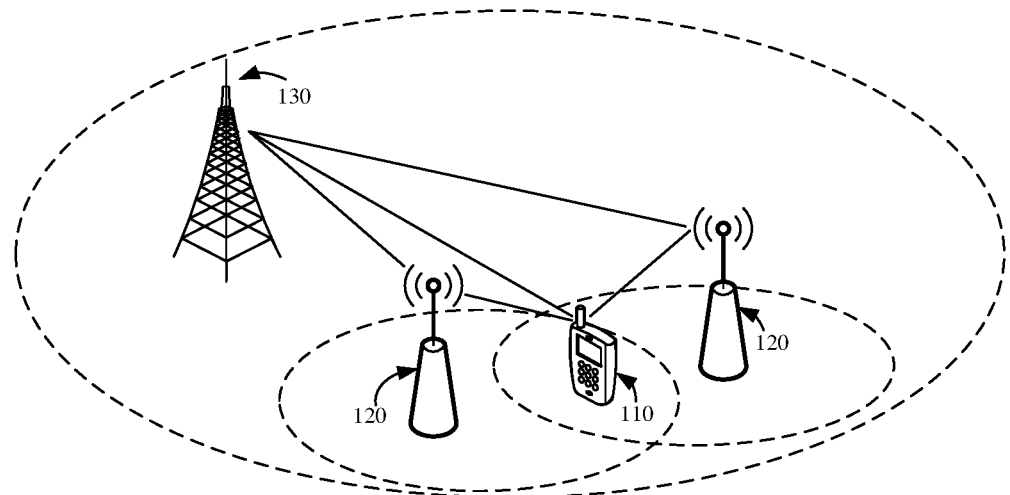

| Cancel or suspend, by a terminal device, an operation of Beam Failure Recovery (BFR) corresponding to a first secondary cell in response to deactivation of the first secondary cell | S210 |

| Start an operation of Beam Failure Recovery (BFR) corresponding to a first secondary cell or continue a suspended operation of the BFR corresponding to the first secondary cell by a terminal device in response to activation of the first secondary cell | S310 |

FIG. 3

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/096426 filed on Jul. 17, 2019, entitled "Wireless Communication Method, Terminal Device and Network Device," the content of which is incorporated herein by reference in its entirety.

TECHNICAL FIELD

Embodiments of the present disclosure generally relate to the communication technical field, and more particularly, to a wireless communication method, a terminal device and a network device.

BACKGROUND

In a communication system, a terminal device can establish a connection with a Primary Cell (PCell) and at least one Secondary Cell (SCell). When a beam on the PCell fails, for example, the quality of the signal transmitted by the beam is lower than a certain threshold, the terminal device can initiate a Beam Failure Recovery (BFR) procedure to switch to a new beam for data transmission. For the secondary cell, how to implement the BFR procedure is an urgent problem to be solved.

SUMMARY

Embodiments of the present disclosure provide a wireless communication method, a terminal device and a network device, which are beneficial to reducing processing complexity of the terminal device.

According to a first aspect, there is provided a wireless communication method, including:

canceling or suspending, by a terminal device, an operation of Beam Failure Recovery (BFR) corresponding to a first secondary cell in response to deactivation of the first secondary cell.

According to a second aspect, there is provided a wireless communication method, including:

starting an operation of Beam Failure Recovery (BFR) corresponding to a first secondary cell or continuing a suspended operation of the BFR corresponding to the first secondary cell by a terminal device in response to activation of the first secondary cell.

According to a third aspect, there is provided a wireless communication method, including:

performing, by a terminal device, corresponding processing on a first secondary cell according to an execution status of Beam Failure Recovery (BFR) corresponding to the first secondary cell.

According to a fourth aspect, there is provided a terminal device configured to perform the method according to the first aspect or any possible implementation of the first aspect. Specifically, the terminal device includes units configured to perform the method according to the first aspect or any possible implementation of the first aspect.

According to a fifth aspect, there is provided a terminal device configured to perform the method according to the second aspect or any possible implementation of the second aspect. Specifically, the terminal device includes units configured to perform the method according to the second aspect or any possible implementation of the second aspect.

According to a sixth aspect, there is provided a terminal device configured to perform the method according to the third aspect or any possible implementation of the third aspect. Specifically, the terminal device includes units configured to perform the method according to the third aspect or any possible implementation of the third aspect.

According to a seventh aspect, there is provided a terminal device including a processor and a memory configured to store a computer program, wherein the processor is used to call and run the computer program stored in the memory to perform the method according to any one of the first to third aspects or any implementation of the first to third aspects.

According to an eighth aspect, there is provided a chip configured to perform the method according to any one of the first to third aspects or any implementation of the first to third aspects.

Specifically, the chip includes a processor configured to call and run a computer program stored in a memory to cause a device in which the chip is installed to perform the method according to any one of the first to third aspects or any implementation of the first to third aspects.

According to a ninth aspect, there is provided a computer-readable storage medium configured to store a computer program, wherein the computer program is configured to cause a computer to perform the method according to any one of the first to third aspects or any implementation of the first to third aspects..

According to a tenth aspect, there is provided a computer program product including computer program instructions that cause a computer to perform the method according to any one of the first to third aspects or any implementation of the first to third aspects.

According to an eleventh aspect, there is provided a computer program. When the computer program runs on a computer, the computer is caused to perform the method according to any one of the first to third aspects or any implementation of the first to third aspects.

Based on the above technical solutions, the terminal device can stop or suspend the beam failure recovery procedure corresponding to a secondary cell at the same time when the secondary cell is deactivated, which can avoid the waste of system resources and the consumption of terminal device processing capabilities and improve system performance. In addition, the beam failure recovery procedure and the activation and deactivation procedure of the terminal device are combined, which can reduce the implementation complexity of the terminal device and improve the BFR efficiency.

BRIEF DESCRIPTION OF THE DRAWINGS

FIG. 1 is a schematic diagram of an application scenario according to an embodiment of the present disclosure.

FIG. 2 is a schematic diagram of a wireless communication method according to a first embodiment of the present disclosure.

FIG. 3 is a schematic diagram of a wireless communication method according to a second embodiment of the present disclosure.

DETAILED DESCRIPTION

Figure 4:
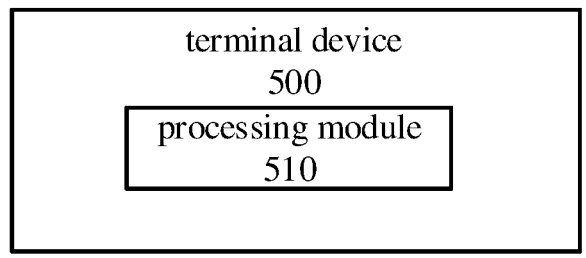
FIG. 4 is a schematic diagram of a wireless communication method according to a third embodiment of the present disclosure.

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on.

As shown in FIG. 1, a terminal device 110 is connected to a first network device 130 in a first communication system and a second network device 120 in a second communication system. For example, the first network device 130 is a Long Term Evolution (LTE) network device, and the second network device 120 is a New Radio (NR) network device.

The first network device 130 and the second network device 120 may include multiple cells.

It should be understood that FIG. 1 is an example of a communication system involved in embodiments of the present disclosure, and embodiments of the present disclosure is not limited to that shown in FIG. 1.

As an example, the communication system to which embodiments of the present disclosure may be adapted may include at least multiple network devices under the first communication system and/or multiple network devices under the second communication system.

For example, the system 100 shown in FIG. 1 may include one primary network device under the first communication system and at least one secondary network device under the second communication system. The at least one secondary network device is connected to the one primary network device to form multiple connections, and the at least one secondary cell is connected to the terminal device 110 to provide services for the terminal device 110. Specifically, the terminal device 110 may simultaneously establish connections through the primary network device and the at least one secondary network device.

According to some embodiments, the connection established between the terminal device 110 and the primary network device is a primary connection, and the connection established between the terminal device 110 and the secondary network device is a secondary connection. Control signaling for the terminal device 110 may be transmitted through the primary connection, and data of the terminal device 110 may be transmitted through the primary connection and the secondary connection at the same time, or may be transmitted only through the secondary connection.

As another example, the first communication system and the second communication system in embodiments of the present application are different, but the specific types of the first communication system and the second communication system are not limited.

For example, the first communication system and the second communication system may be various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Time Division Duplex (TDD) system, a Universal Mobile Telecommunication System (UMTS), etc.

The primary network device and the secondary network device may be any access network device.

In some embodiments, the access network device may be a base station (Base Transceiver Station, BTS) in the Global System of Mobile communication (GSM) system or Code Division Multiple Access (CDMA) system, or the access network device can be a base station (NodeB, NB) in a Wideband Code Division Multiple Access (WCDMA) system, or can be an evolved base station (Evolutional Node B, eNB or eNodeB) in a Long Term Evolution (LTE) system.

According to some embodiments, the access network device may be a base station (gNB) in a Next Generation Radio Access Network (NG RAN) or an NR system, or a wireless controller in a Cloud Radio Access Network (CRAN), or the access network device can be a relay station, an access point, a vehicle-mounted device, a wearable device, or a network device in a future evolved Public Land Mobile Network (PLMN), etc.

In the system 100 shown in FIG. 1, an illustrative architecture in which the first network device 130 is the primary network device and the second network device 120 is the secondary network device is used as an example.

The first network device 130 may be an LTE network device, and the second network device 120 may be an NR network device. Or, the first network device 130 may be an NR network device, and the second network device 120 may be an LTE network device. Or, both the first network device 130 and the second network device 120 may be NR network devices. Alternatively, the first network device 130 may be a GSM network device, or a CDMA network device and so on, and the second network device 120 may be a GSM network device, or a CDMA network device and so on. Or, the first network device 130 may be a macrocell, and the second network device 120 may be a microcell), a picocell, or a femtocell).

According to some embodiments, the terminal device 110 may be any terminal device, and the terminal device 110 may be connected in the following manners (including but not limited to):

The terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together. In addition, the character "/" generally indicates that the associated objects before and after "/" are in an "or" relationship.

In embodiments of the present disclosure, a corresponding BFR procedure can be designed according to characteristics of a secondary cell itself. For example, the secondary cell can have activation and deactivation procedures, and when the link quality of the secondary cell has problems, a primary cell or a primary secondary cell corresponding to the secondary cell can be used for communications.

Based on this, for example, the activation or deactivation procedure of the secondary cell and the BFR operation corresponding to the secondary cell can be jointly processed, which is beneficial to reducing the implementation complexity of the terminal and simplifying the processing procedure of the terminal device.

In the following, relevant processing procedures of the BFR corresponding to a secondary cell in a case that the secondary cell is deactivated or in a case that the secondary cell is activated and processing procedures for the secondary cell in a case that the BFR fails or succeeds will be described with reference to first to third embodiments.

It should be understood that the first embodiment, the second embodiment, and the third embodiment can be implemented separately or in combination, which is not limited in the embodiments of the present disclosure. For example, after deactivating a first secondary cell, the BFR operation corresponding to the first secondary cell is cancelled or suspended (first embodiment). Further, the terminal device may activate the first secondary cell, and start or continue the BFR operation corresponding to the first secondary cell (second embodiment). Alternatively, after activating the first secondary cell, the BFR operation corresponding to the first secondary cell is started or continued (second embodiment). Further, the terminal device can deactivate the first secondary cell and stop or suspend the BFR operation corresponding to the first secondary cell (first embodiment). Alternatively, after activating the first secondary cell and starting or continuing the BFR operation corresponding to the first secondary cell, corresponding processing for the first secondary cell may be determined according to the execution of the BFR corresponding to the first secondary cell (third embodiment). For example, the first secondary cell may be deactivated when the BFR corresponding to the first secondary cell fails, or the terminal device may continue to use the first secondary cell for communications when the BFR corresponding to the first secondary cell is successful.

First Embodiment

In the embodiment of the present disclosure, the terminal device may be configured with one or more secondary cells. Specifically, the Media Access Control (MAC) layer entity of the terminal device may be configured with one or more secondary cells. The one or more secondary cells may include a first secondary cell. If the first secondary cell is in an activated state, the terminal device may deactivate the first secondary cell. For example, the terminal device may deactivate the first secondary cell according to deactivation signaling from a network device or a deactivation timer. Further, the terminal device may cancel or suspend the BFR related operations corresponding to the first secondary cell in a case that the first secondary cell is deactivated.

FIG. 2 is a schematic flowchart of a wireless communication method according to the first embodiment of the present disclosure. The method 200 may be performed by the terminal device in the communication system shown in FIG. 1. As shown in FIG. 2, the method 200 may include at least part of the following contents:

In S210, the terminal device cancels or suspends an operation of Beam Failure Recovery (BFR) corresponding to a first secondary cell in response to deactivation of the first secondary cell.

It should be understood that, in the embodiment of the present disclosure, the operation of the BFR corresponding to the first secondary cell may be an operation used for the BFR of the first secondary cell, or an operation of the BFR associated with the first secondary cell. The operation of the BFR corresponding to the first secondary cell may be used for the beam recovery on the first secondary cell, or in other words, used for link recovery on the first secondary cell.

According to some embodiments of the present disclosure, the operation of the BFR corresponding to the first secondary cell may also be referred to as a BFR procedure corresponding to the first secondary cell, and the BFR procedure corresponding to the first secondary cell may include one or a combination of various operations in embodiments described below.

According to some embodiments, the operation of BFR corresponding to the first secondary cell may be partially performed on the first secondary cell and partially performed on other cell, for example, the primary cell or primary secondary cell, and so on. The operation of BFR performed on other cell may be used for beam recovery on the first secondary cell, or in other words, used for link recovery on the first secondary cell.

According to some embodiments of the present disclosure, the terminal device deactivates the first secondary cell according to network signaling or a timer.

According to some embodiments, the network signaling may be Media Access Control Control Element (MAC CE) signaling, which is used to indicate to deactivate the first secondary cell. Or, the network signaling may be other dynamic signaling, such as Downlink Control Information (DCI) and so on.

According to some embodiments, the network signaling may include first BFR indication information. The first BFR indication information is used to indicate that the network signaling is also used to trigger cancelling or suspending of the operation of BFR. Further, when the first BFR indication information indicates that the network signaling is also used to trigger cancelling or suspending of the operation of BFR, the terminal device may perform operations related to canceling or suspending of the BFR corresponding to the first secondary cell.

According to some embodiments, the timer is a secondary cell deactivation timer (sCellDeactivationTimer) corresponding to the first secondary cell. When the timer ends (or expires), the terminal device activates the first secondary cell, and during the running of the timer, the first secondary cell is in an activated state.

When the terminal device determines to deactivate the first secondary cell, the terminal device may perform at least one of the following operations for the first secondary cell:

2.1. The operation is performed on the MAC entity (MAC entity) of the terminal device.

2.2. The operation includes: the terminal device stopping the secondary cell deactivation timer corresponding to the first secondary cell.

2.2.1. The secondary cell deactivation timer is used to control the deactivation operation of the corresponding secondary cell.

2.2.2. The secondary cell deactivation timer is sCellDeactivationTimer.

2.3. The operation includes: the terminal device stopping a Band Width Part (BWP) inactivity timer corresponding to the first secondary cell.

2.3.1. The BWP inactivity timer is used to control the deactivation operation of the BWP corresponding to the first secondary cell.

2.3.2. The BWP inactivity timer is bwp-InactivityTimer.

2.4. The operation includes: the terminal device deactivating an active BWP corresponding to the first secondary cell.

Further, in the case that the first secondary cell is deactivated, the terminal device may cancel or suspend the BFR related operations corresponding to the first secondary cell. Specifically, at least one of the following operations may be included.

2.5. The operation includes: at the physical layer, the terminal device stopping measuring a beam failure detection reference signal (BFD RS) resource corresponding to the first secondary cell. When the terminal device deactivates the secondary cell, the measurement of the beam failure detection reference signal on the beam failure detection reference signal resource is stopped at the same time, which can reduce the processing complexity of the terminal device and can also reduce the power consumption of the terminal device.

The beam failure detection reference signal corresponding to the first secondary cell may be understood as a beam failure detection reference signal used for the beam failure recovery procedure of the first secondary cell. The beam failure detection reference signal corresponding to the first secondary cell may be referred to as the beam failure detection reference signal corresponding to the BFR procedure corresponding to the first secondary cell. The link quality of the first secondary cell can be determined by measuring the beam failure detection reference signal.

According to some embodiments of the present disclosure, the beam failure detection reference signal resource corresponding to the first secondary cell may be one or more groups. For example, each secondary cell may correspond to a group of beam failure detection reference signal resources. The BFR corresponding to each secondary cell can be based on its own corresponding group of beam failure detection reference signal resources. Or, the first secondary cell can correspond to multiple groups of beam failure detection reference signal resources, and each group of beam failure detection reference signal resources can correspond to a corresponding BFR procedure. For example, each group of beam failure detection reference signal resources can correspond to one BWP of the first secondary cell, and the BFR procedure for this BWP can use the beam failure detection reference signal resources corresponding to the BWP instead of using beam failure detection reference signal resources corresponding to other BWP. For example, when the BWP is deactivated, the measurement of the beam failure detection reference signal resources corresponding to the BWP is stopped, and if other BWPs are in an active state, the measurement of the beam failure detection reference signal resources corresponding to the other BWPs can be continued.

It should be understood that, in embodiments of the present disclosure, the measurement of a beam failure detection reference signal resource may also be considered as a measurement of the beam failure detection reference signal transmitted on the beam failure detection reference signal resource. The measurement of the beam failure detection reference signal resource can be used to determine the channel quality of Physical Downlink Control Channel (PDCCH) corresponding to the beam failure detection reference signal resource, for example, Reference Signal Receiving Power (RSRP), Reference Signal Receiving Quality (RSRQ), Carrier to Interference plus Noise Ratio (SR-SINR).

2.5.1. According to some embodiments, the MAC layer of the terminal device may notify the physical layer to stop measuring the beam failure detection reference signal resource. That is, the physical layer may stop measuring the beam failure detection reference signal on the beam failure detection reference signal resource based on the notification of the MAC layer.

2.5.2 According to some embodiments, the beam failure detection reference signal resource may be determined according to a configuration of the network device.

2.5.2.1. According to some embodiments, the beam failure detection reference signal resource may be determined according to a Radio Resource Control (RRC) parameter. For example, the RRC parameter may include indication information of the beam failure detection reference signal resource, such as failureDetectionResources. In other words, the network device can configure the beam failure detection reference signal resources for the terminal device through failureDetectionResources.

2.5.3. According to some embodiments, the beam failure detection reference signal resource may also be determined based on Transmission Configuration Information (TCI) state of the Control Resource Set (CORESET) corresponding to the first secondary cell.

Specifically, the network device can configure CORESET for the terminal device in order to make the terminal device to monitor the PDCCH. Before the network device transmits the PDCCH, the network device can configure the terminal device with the TCI state so as to indicate to the terminal device the Quasi-co-located (QCL) reference signal corresponding to the PDCCH. Thus, the terminal device can receive corresponding PDCCH using the receiving beam which is used to receive the QCL reference signal.

According to some embodiment of the present disclosure, a TCI state may include the following configurations:
1. TCI state identity (ID) used to identify a TCI state;
2. QCL information 1;
3. QCL information 2.

According to some embodiments, one piece of QCL information may include the following information:

QCL type configuration, which can be, for example, one of QCL type A (QCL TypeA), QCL type B (QCL TypeB), QCL type C (QCL TypeC) or QCL type D (QCL TypeD);

QCL reference signal configuration, which may include, for example, cell ID and the bandwidth part (BWP) ID where the reference signal is located, and identification of the reference signal, for example, it may be a CSI-RS resource ID or an SSB index.

According to some embodiments, in QCL information 1 and QCL information 2, the QCL type of at least one QCL information is one of QCL TypeA, QCL TypeB, and QCL TypeC. If another QCL information is configured, the QCL type of the QCL information is QCL TypeD.

According to some embodiments, the definitions of different QCL type configurations are as follows:
1. QCL-TypeA: {Doppler shift, Doppler spread, average delay, delay spread};
2. QCL-TypeB: {Doppler shift, Doppler spread};
3. QCL-TypeC: {Doppler shift, average delay};
4. QCL-TypeD: {Spatial Rx parameter}.

Therefore, in embodiments of the present disclosure, the beam failure detection reference signal may be determined according to the reference signal configured in the TCI state. For example, the reference signal configured in the TCI state may be used as the beam failure detection reference signal.

2.5.4. According to some embodiments, the beam failure detection reference signal resource may correspond to a set $\bar{q}_0$, and the set $\bar{q}_0$ may include a periodic Channel State Information Reference Signal (CSI-RS) resource. Specifically, the network device may configure periodic CSI-RS resources, and the periodic CSI-RS resources may be used to transmit periodic CSI-RS, and the periodic CSI-RS resources may constitute the beam failure detection reference signal resource set $\bar{q}_0$.

2.6. According to some embodiments, the operation includes: at the physical layer, the terminal device stopping reporting the measurement status of the beam failure detection reference signal resource corresponding to the first secondary cell to the MAC layer. When the terminal device deactivates the secondary cell, the terminal device stops reporting the measurement status of the beam failure detection reference signal resource to the MAC layer at the same time, which can reduce the processing complexity of the terminal device, save the power consumption of the terminal device, and improve the flexibility of the terminal device implementations. For example, the terminal device can measure part of the beam failure reference signal resources according to its own power consumption and correspondence requirements, without reporting to the MAC layer.

For the meaning of the beam failure detection reference signal resource corresponding to the first secondary cell described in 2.6, reference may be made to the related description in 2.5, which will not be repeated here.

2.6.1. According to some embodiments, the MAC layer may notify the physical layer to stop reporting the measurement status of the beam failure detection reference signal resource to the MAC layer. That is, the physical layer may stop reporting the measurement status of the beam failure detection reference signal on the beam failure detection reference signal resource to the MAC layer based on the notification of the MAC layer.

2.6.2. According to some embodiments, the beam failure detection reference signal resource may be determined according to a configuration of the network device.

2.6.2.1. According to some embodiments, the beam failure detection reference signal resource may be determined according to an RRC parameter. For example, the RRC parameter may include the indication information failureDetectionResources of the beam failure detection reference signal resource.

2.6.3. According to some embodiments, the beam failure detection reference signal resource may be determined according to the TCI state of the CORESET corresponding to the first secondary cell. For specific implementation, reference may be made to the related description in 2.5.3, which will not be repeated here.

2.6.4. According to some embodiments, the beam failure detection reference signal resource may correspond to a set $\bar{q}_0$, and the set $\bar{q}_0$ may include a periodic CSI-RS resource. For specific implementation, reference may be made to the relevant description in 2.5.4, which will not be repeated here.

2.6.5. According to some embodiments, the measurement status of the beam failure detection reference signal resource reported by the physical layer to the MAC layer may include a beam failure instance.

According to some embodiments, when the measurement result of the beam failure detection reference signal satisfies a certain condition (for example, the channel quality is less than a threshold), it can be considered as a beam failure instance. According to some embodiments, the measurement status of the beam failure detection reference signal resource may also include the measurement result of the beam failure reference signal, such as RSRQ, RSRP, and so on, or may include the cumulative number of beam failure instances, that is, the number of times the measurement result of the beam failure detection reference signal meets a certain condition.

2.7. The operation includes: the MAC layer stopping receiving the measurement status of the beam failure detection reference signal resource corresponding to the first secondary cell reported by the physical layer. When the terminal device deactivates the secondary cell, the MAC layer stops receiving the measurement status on the beam failure detection reference signal resource, which reduces the processing complexity of the terminal device, saves the power consumption of the terminal device, and improves the flexibility of the terminal device implementations.

2.7.1. According to some embodiments, the measurement status of the beam failure detection reference signal resource reported by the physical layer to the MAC layer may include a beam failure instance. For specific implementation, reference may be made to the relevant description in 2.6.5, which will not be repeated here.

2.8. The operation includes: stopping a timer used for counting beam failure instances corresponding to the first secondary cell. When the terminal device deactivates the secondary cell, the terminal device stops the timing of the timer corresponding to the beam failure instance at the same time, so as to better match the BFR procedure and improve the system performance.

The beam failure instances corresponding to the first secondary cell may be understood as the beam failure instances counted in the beam failure recovery procedure of the first secondary cell. The beam failure instances corresponding to the first secondary cell may be referred to as the beam failure instances corresponding to the BFR procedure corresponding to the first secondary cell. By counting the beam failure instances, whether a beam failure occurs in the first secondary cell may be determined.

In embodiments of the present disclosure, there may be one or more timers for the beam failure instances corresponding to the first secondary cell. For example, each secondary cell may correspond to one timer for the beam failure instances, and the BFR corresponding to each secondary cell can be based on the timer for beam failure instances, or the first secondary cell can correspond to the multiple timers for beam failure instances, and each timer for beam failure instances can correspond to a corresponding BFR procedure. For example, each timer for beam failure instances can correspond to a BWP of the first secondary cell, and the BFR procedure for this BWP can use the timer for beam failure instances corresponding to the BWP instead of using the timer for beam failure instances corresponding to other BWPs. For example, when the BWP is deactivated, the timing of the timer for beam failure instances corresponding to the BWP is stopped, and if the other BWP is in an active state, timing of the timer for beam failure instances corresponding to the other BWP can be continued.

In embodiments of the present disclosure, stopping the timer used for counting beam failure instances may include: turning off the timer. In this way, when the BFR procedure is resumed, the timer can be started or restarted, that is, start timing from zero. Alternatively, the timer may not be turned off, but the timer's timing can be reset to zero, so that when the BFR procedure is resumed, the timing will be restarted. Alternatively, the timer can be suspended. In this way, when the BFR procedure is resumed, the timing of the timer can be continued, that is, the timing will continue based on the previous timing.

2.8.1. According to some embodiments, the timer is a beam failure detection timer (beamFailureDetectionTimer).

2.9. The operation includes: suspending or resetting a count value of beam failure instances (BFIs) corresponding to the first secondary cell.

In 2.9, for the specific meaning of the beam failure instances corresponding to the first secondary cell, reference can be made to related description in 2.8, and repeated descriptions will be omitted here.

When the terminal device deactivates the secondary cell, the counting of beam failure instances is suspended. In this way, when the secondary cell is reactivated, if the link quality does not change significantly, the previous counting can be continued, which can speed up the BFR procedure and reduce the delay. Resetting the counting of beam failure instances can facilitate the implementations of the terminal device, and avoid occupation of resources for maintaining the beam failure instance related information by the terminal device after deactivating the secondary cell.

2.9.1. The counting of the beam failure instances is BFI_COUNTER.

2.9.2. According to some embodiments, resetting the counting of beam failure instances may be setting BFI_COUNTER to 0.

2.9.3 According to some embodiments, suspending the counting of the beam failure instances can be temporarily stopping the cumulative counting of the BFI_COUNTER, and when the BFR procedure is resumed, the counting continues based on the previous cumulative count.

2.10. According to some embodiments, the operation includes: the terminal device stopping measuring a candidate beam reference signal group corresponding to the first secondary cell at the physical layer. When the terminal device deactivates the secondary cell, the measurement of the candidate beam reference signal in the candidate beam reference signal group is stopped at the same time, which can reduce the processing complexity of the terminal device and also reduce the power consumption of the terminal device.

The candidate beam reference signal group corresponding to the first secondary cell may be understood as a candidate beam reference signal group used in the beam failure recovery procedure of the first secondary cell. The candidate beam reference signal group corresponding to the first secondary cell may be referred to as a candidate beam reference signal group corresponding to the BFR procedure corresponding to the first secondary cell. By measuring the candidate beam reference signal group, it is possible to determine which beam the first secondary cell switches to for data transmission.

In embodiments of the present disclosure, there may be one or more candidate beam reference signal groups corresponding to the first secondary cell. For example, each secondary cell may correspond to one group of candidate beam reference signals, and the BFR corresponding to each secondary cell may be based on the group of candidate beam reference signals corresponding to the BFR itself Alternatively, the first secondary cell may correspond to multiple groups of candidate beam reference signals, and each group of candidate beam reference signals may correspond to a corresponding BFR procedure. For example, each group of candidate beam reference signals may correspond to one BWP of the first secondary cell, and the BFR procedure for the BWP may use the candidate beam reference signal group corresponding to the BWP instead of using the candidate beam reference signal group corresponding to other BWPs. For example, when the BWP is deactivated, the measurement of the candidate beam reference signal group corresponding to the BWP is stopped, and if other BWPs are in an active state, the measurement of the candidate beam reference signal groups corresponding to the other BWPs can be continued.

2.10.1. According to some embodiments, the candidate beam reference signal group includes one or more candidate beam reference signals.

2.10.2. According to some embodiments, the candidate beam reference signal group may be determined according to configuration from the network device.

2.10.2.1. According to some embodiments, the candidate beam reference signal group may be determined according to a Radio Resource Control (RRC) parameter. For example, the RRC parameter may include a candidate beam reference signal list (candidateBeamRSList). For example, the network device may configure a candidateBeamRSList for the terminal device, and the candidate beam reference signal(s) in the candidateBeamRSList may be used by the terminal device to perform measurements to select a new candidate beam.

According to some embodiments, the candidateBeamRSList may be configured by the network device through higher layer signaling.

2.10.3. According to some embodiments, the candidate beam reference signal group may be determined according to a CSI-RS resource identifier and/or a synchronizing signal/PBCH block (SS/PBCH block) number.

According to some embodiments, the CSI-RS resource identifier and/or the SS/PBCH block number may be configured by the network device.

2.10.4. According to some embodiments, the resource corresponding to the candidate beam reference signal group may be one of the following three situations:
2.10.4.1. periodic CSI-RS resources;
2.10.4.2. SS/PBCH block;
2.10.4.3. periodic CSI-RS resources and SS/PBCH block.

2.10.5. According to some embodiments, the MAC layer notifies the physical layer to stop measuring the candidate beam reference signal in the candidate beam reference signal group. That is, the physical layer may stop the measurement of the candidate beam reference signal in the candidate beam reference signal group based on the notification of the MAC layer.

2.11. According to some embodiments, the operation includes: at the physical layer, the terminal device stopping reporting the measurement status of the candidate beam reference signal in the candidate beam reference signal group corresponding to the first secondary cell to the MAC. When the terminal device deactivates the secondary cell, the physical layer stops reporting the measurement status of the candidate beam reference signal in the candidate beam reference signal group to the MAC layer at the same time, which can reduce the processing complexity of the terminal device, save the power consumption of the terminal device, and improve the flexibility of terminal device implementations. For example, the terminal device can measure some candidate beam reference signals according to its own power consumption and correspondence requirements, without reporting to the MAC layer.

For the meaning of the candidate beam reference signal group corresponding to the first secondary cell in 2.11, reference may be made to the related description in 2.10, which will not be repeated here.

2.11.1. According to some embodiments, the measurement status of the candidate beam reference signal in the candidate beam reference signal group by the terminal device may include:

information (for example, identifier of the reference signal) of a target candidate beam reference signal whose link quality satisfies a first condition, and/or a measurement result corresponding to the target candidate beam reference signal, for example, RSRQ or RSRP and so on.

2.11.1.1. The link quality corresponding to the candidate beam reference signal satisfying the first condition includes that the link quality corresponding to the candidate beam reference signal is greater than a first threshold, or greater than or equal to the first threshold.

2.11.1.2 According to some embodiments, the first threshold is configured by the network device, or pre-configured.

2.11.2. According to some embodiments, the candidate beam reference signal group may be determined according to a configuration of the network device.

2.11.2.1 According to some embodiments, the candidate beam reference signal group may be determined according to an RRC parameter. For specific implementations, refer to the related description of 2.10.2.1, which will not be repeated here.

2.11.3. According to some embodiments, the candidate beam reference signal group may be determined according to a CSI-RS resource identifier and/or a synchronization signal block/PBCH block (SS/PBCH block) number.

2.11.4. According to some embodiments, the resource corresponding to the candidate beam reference signal group may be one of the following three situations:
2.11.4.1. periodic CSI-RS resources;
2.11.4.2. SS/PBCH block;
2.11.4.3. periodic CSI-RS resources and SS/PBCH block.

2.11.5. According to some embodiments, the terminal device at the MAC layer notifies the physical layer to stop reporting the measurement status of the candidate beam reference signal in the candidate beam reference signal group to the MAC. That is, the physical layer may stop reporting the measurement status of the candidate beam reference signal in the candidate beam reference signal group to the MAC based on the notification of the MAC layer.

2.12. According to some embodiments, the operation includes: stopping or resetting a beam failure recovery timer (or referred to as a link recovery timer) corresponding to the first secondary cell. When the terminal device deactivates the secondary cell, the terminal device stops or resets the counting of beam failure instances to facilitate the implementation of the terminal device and avoid occupation of resources used for the terminal device to maintain related information of the beam failure instances after deactivating the secondary cell.

The beam failure recovery timer corresponding to the first secondary cell may be understood as a beam failure recovery timer used in the beam failure recovery procedure of the first secondary cell. The beam failure recovery timer corresponding to the first secondary cell may be called as the beam failure recovery timer corresponding to the BFR procedure corresponding to the first secondary cell.

In embodiments of the present disclosure, there may be one or more beam failure recovery timers corresponding to the first secondary cell. For example, each secondary cell may correspond to one beam failure recovery timer, and the BFR corresponding to each secondary cell can be based on a corresponding beam failure recovery timer; or, the first secondary cell can correspond to multiple beam failure recovery timers, and each beam failure recovery timer can correspond to a corresponding BFR procedure. For example, each beam failure recovery timer may correspond to one BWP of the first secondary cell, and the BFR procedure for the BWP may use the beam failure recovery timer corresponding to the BWP instead of using the beam failure recovery timers corresponding to other BWPs. For example, when the BWP is deactivated, the timing of the beam failure recovery timer corresponding to the BWP is stopped. If other BWPs are in an active state, the timing of the beam failure recovery timers corresponding to the other BWPs can be continued.

It should be understood that stopping the beam failure recovery timer here may refer to turning off the beam failure recovery timer, or may refer to pausing the timer. Resetting the beam failure recovery timer may refer to setting the timing value of the timer to zero or other initial value.

According to some embodiments, the terminal device may report first information to the network device. According to some embodiments, the first information may be a beam failure recovery request.

2.12.1. According to some embodiments, the beam failure recovery timer may be started after the terminal device sends the first information to the network device.

For example, the terminal device may start the timer immediately after sending the first information to the network device, or start the timer within a period of time after the sending is completed.

2.12.2. According to some embodiments, the beam failure recovery timer may be started when the terminal device sends the first information to the network device. For example, the terminal device may start the timer when sending the first information to the network device, or start the timer when starting to send the first information.

2.12.3. According to some embodiments, the first information may be transmitted through PUCCH.

2.12.3.1 According to some embodiments, the first information is used to indicate a beam failure. For example, the beam failure may mean that the link quality of at least one secondary cell is poor enough to satisfy a second condition.

As an embodiment, the first information may be the PUCCH, that is, the terminal device may transmit the PUCCH through other cell to indicate the beam failure.

According to some embodiments, the PUCCH transmission mode may be used to distinguish the PUCCH for indicating the beam failure and other PUCCHs. For example, the PUCCH for indicating the beam failure can be transmitted through a specific resource, or scrambled in a specific manner and so on to distinguish from other PUCCHs.

As another embodiment, the PUCCH may include indication information. The indication information may be used to indicate a beam failure. The first information may be the indication information. For example, the indication information may be one bit. Different values of the one bit indicate a beam failure or a beam success. For example, a value of 0 for this one bit indicates a beam failure, and a value of 1 indicates a beam success.

According to some embodiments, the at least one secondary cell may include the first secondary cell, or may further include other secondary cells, that is, the terminal device may report the beam failure conditions of multiple secondary cells in a combined manner.

2.12.3.2 According to some embodiments, the link quality corresponding to the secondary cell being poor enough to satisfy the second condition may include that the cumulative number of beam failure instances corresponding to the secondary cell is greater than a second threshold, or greater than or equal to a second threshold.

For example, when the link quality corresponding to the secondary cell being less than a certain threshold can be considered as a beam failure instance, if the link quality of the secondary cell is measured as going lower than the threshold for multiple times, and the cumulative number of beam failure instances is greater than, or, greater than or equal to the second threshold, it is considered that the link quality corresponding to the secondary cell satisfies the second condition. The link quality of the secondary cell can be determined by measuring the beam failure detection reference signal of the secondary cell. For specific implementations, reference may be made to related descriptions above, which will not be repeated here.

2.12.3.3. According to some embodiments, the second threshold may be configured by a network device or preconfigured.

2.12.4. According to some embodiments, the first information may be transmitted through MAC CE.

According to some embodiments, the first information may be used to indicate at least one of the following 2.12.4.1 to 2.12.4.3:

2.12.4.1 According to some embodiments, the first information is used to indicate a beam failure. For specific implementations, reference may be made to the related implementations of 2.12.3, which will not be repeated here.

2.12.4.2 According to some embodiments, the first information is used to indicate identity information corresponding to a cell where the beam failure occurs, such as a cell ID.

2.12.4.3. According to some embodiments, the first information is used to indicate information of a new beam selected by the terminal device, for example, a beam ID. According to some embodiments, the new beam may be determined by the terminal device according to the measurement result of the candidate beam reference signal. For example, the terminal device may determine that the beam with the best link quality corresponding to the candidate beam reference signal is the new beam, and the new beam may be used for subsequent data transmission by the terminal device in the case of beam recovery failure.

2.12.5. According to some embodiments, the beam failure recovery timer is beamFailureRecoveryTimer.

2.12.6. According to some embodiments, the beam failure recovery timer is used for the terminal device to wait for a response of the network device for the first information sent by the terminal device.

For example, when the beam failure recovery timer does not expire, the terminal device may monitor the response of the network device for the first information, and when the timer expires, the terminal device may stop monitoring the response of network device for the first information.

2.12.7. According to some embodiments, the first information may be transmitted through PUCCH or MAC CE on other cell except for the first secondary cell.

According to some embodiments, the other cell may be a Special Cell (SpCell) corresponding to the first secondary cell, for example, a Primary Cell (PCell) or a Primary Secondary cell (PSCell). The primary cell is a primary cell in a Master Cell Group (MCG), and the Primary Secondary cell (PSCell) is a Primary Secondary cell in a Secondary Cell Group (SCG).

It should be understood that the terminal device may also send the first information through other cells than the PCell or PSCell, or may send the first information through other uplink message or uplink channel on other cells, and embodiments of the present disclosure do not impose specific limitations on this.

In embodiments of the present disclosure, when the first secondary cell is deactivated, the terminal device can stop or reset the beam failure recovery timer. Accordingly, the terminal device can stop monitoring the network device's response to the first information sent by the terminal device. This is beneficial to simplifying the BFR procedure and reducing the complexity of terminal implementations.

2.13. The operation includes: the terminal device stopping monitoring the response of the network device for the first information corresponding to the first secondary cell sent by the terminal device. When the terminal device deactivates the secondary cell, the terminal device stops monitoring the response of the network device for the first information sent by the terminal device, which can simplify the BFR procedure and reduce the complexity of terminal implementations.

According to some embodiments, the first information may be used to indicate at least one of the following 2.13.1 to 2.13.3:

2.13.1. According to some embodiments, the first information is used to indicate a beam failure. For example, the beam failure may mean that the link quality corresponding to at least one secondary cell is poor enough to satisfy a second condition.

2.13.1.1. According to some embodiments, the link quality corresponding to the secondary cell being poor enough to satisfy the second condition may include that the cumulative number of beam failure instances corresponding to the secondary cell is greater than a second threshold, or greater than or equal to the second threshold. For specific implementations, please refer to the related implementations in 2.12.3, which will not be repeated here.

2.13.1.2 According to some embodiments, the second threshold may be determined according to a configuration of the network device.

2.13.2. According to some embodiments, the first information is used to indicate identity information corresponding to a cell where the beam failure occurs, such as a cell ID.

2.13.3. According to some embodiments, the first information is used to indicate information of a new beam selected by the terminal device, for example, a beam ID. According to some embodiments, the new beam may be determined according to the candidate beam reference signal. For example, it may be determined that the beam with the best link quality corresponding to the candidate beam reference signal is the new beam, and the new beam may be used for subsequent data transmission of the terminal device.

2.13.4. The first information may be transmitted through PUCCH and/or MAC CE. For example, the beam failure may be transmitted through PUCCH, and the cell ID of the cell where the beam failure occurs and the information of the new beam selected by the terminal device may be transmitted through MAC CE.

2.13.4.1 According to some embodiments, the first information may be transmitted through PUCCH and/or MAC CE on other cells than the first secondary cell. For specific implementations, reference may be made to the related descriptions in 2.12.7, which will not be repeated here.

It should be understood that, in embodiments of the present disclosure, the terminal device canceling the beam failure recovery procedure may also be referred to as the terminal device terminating the beam failure recovery procedure, that is, stopping the beam failure recovery related operations. The terminal device stopping the beam failure recovery procedure may also be referred to as the terminal device suspending the beam failure recovery procedure, that is, the operations related to beam failure recovery is temporarily stopped. In other words, the canceling or suspending beam failure recovery procedure may include one or more of the operations in 2.5 to 2.13.

When the terminal device deactivates the secondary cell, the terminal device stops the beam failure recovery related operations at the same time, which can simplify the BFR procedure and save the power consumption of the terminal device. Or, when the terminal device deactivates the secondary cell, the terminal device suspends the beam failure recovery related operations at the same time. In this way, when the first secondary cell is reactivated, if the link quality of the first secondary cell does not change much, the previous BFR procedure can be continued, which can speed up the BFR procedure and reduce the BFR delay.

2.14. According to some embodiments, a part of the operations in the beam failure recovery procedure is performed on the first secondary cell.

For example, the measurement of the beam failure detection reference signal and the reporting of the measurement status, the measurement of the candidate beam reference signal group and the reporting of the measurement status in the beam failure recovery procedure and so on may be performed on the first secondary cell.

2.15. According to some embodiments, a part of the operations in the beam failure recovery procedure are performed on other cell(s) corresponding to the first secondary cell.

For example, the reporting of the first information may be performed on other cell(s).

According to some embodiments, the other cell may be a Special Cell (SpCell) corresponding to the first secondary cell, for example, a Primary Cell (PCell), or a Primary Secondary cell (PSCell). The Primary Cell is a Primary Cell in a Master Cell Group (MCG), and the Primary Secondary cell (PSCell) is a Primary Secondary cell in a Secondary Cell Group (SCG).

2.16. According to some embodiments, when the terminal device triggers the cancellation or suspension of the BFR procedure, the terminal device may report information to the network device through the PUCCH in the PCell or PSCell. For example, the first information described in 2.12 or 2.13 is sent to the network device.

2.16.1. According to some embodiments, the first information is used to indicate a beam failure. For example, the beam failure may mean that the link quality corresponding to at least one secondary cell satisfies the second condition.

2.16.1.1. According to some embodiments, the link quality corresponding to the secondary cell satisfying the second condition may include that the cumulative number of beam failure instances corresponding to the secondary cell is greater than a second threshold, or greater than or equal to the second threshold.

For example, the link quality corresponding to the secondary cell being less than a certain threshold can be considered as a beam failure instance. If the link quality of the secondary cell is measured as going lower than the threshold for multiple times, and the cumulative number of beam failure instances is greater than, or, greater than or equal to the second threshold, it is considered that the link quality corresponding to the secondary cell satisfies the second condition.

2.16.1.2 According to some embodiments, the second threshold may be determined according to a configuration of the network device.

2.17. According to some embodiments, when the terminal device triggers the cancellation or suspension of the BFR procedure, the terminal device may report information to the network device through the MAC CE in the PCell or PSCell. For example, the first information described in 2.12 is sent to the network device.

According to some embodiments, the first information may be used to indicate at least one of the following 2.17.1 to 2.17.3:

2.17.1. According to some embodiments, the first information is used to indicate identity information corresponding to a cell where the beam failure occurs, such as a cell ID.

2.17.2. According to some embodiments, the first information is used to indicate information of a new beam selected by the terminal device, for example, a beam ID. According to some embodiments, the new beam may be determined according to the candidate beam reference signal. For example, it may be determined that the beam with the best link quality corresponding to the candidate beam reference signal is the new beam, and the new beam may be used for subsequent data transmission of the terminal device.

2.17.3. According to some embodiments, the first information is used to indicate a beam failure. For specific implementations, reference may be made to the related descriptions in 2.12.3, which will not be repeated here.

It should be understood that the terminal device may also send the first information through other activated cells than the PCell or PSCell, or may send the first information through other uplink message or uplink channel on other cells, and embodiments of the present disclosure do not impose specific limitations on this.

2.18. The above operations are for an active BWP corresponding to the first secondary cell, or called an activated BWP.

That is, the BFR procedure corresponding to the active BWP can be cancelled or suspended.

In some embodiments, the foregoing operations may be performed directly at the physical layer without notification from the MAC layer. In this case, the operations may include at least one of the following:

3.1. The operation is performed at the physical layer.

3.2. According to some embodiments, the operation includes: the terminal device stopping measuring the beam failure detection reference signal resource corresponding to the first secondary cell. When the terminal device deactivates the secondary cell, the measurement of the beam failure detection reference signal on the beam failure detection reference signal resource is stopped at the same time, which can reduce the processing complexity of the terminal device and save the power consumption of the terminal device.

For the meaning of the beam failure detection reference signal resource corresponding to the first secondary cell described in 3.2, reference may be made to the related descriptions in 2.5, which will not be repeated here.

3.2.1. According to some embodiments, the beam failure detection reference signal resource may be determined according to configuration from the network device.

3.2.1.1. According to some embodiments, the beam failure detection reference signal resource may be determined according to an RRC parameter.

According to some embodiments, the RRC parameter may include indication information (failureDetectionResources) of the beam failure detection reference signal resource.

3.2.2. According to some embodiments, the beam failure detection reference signal resource may be determined according to the transmission configuration indication TCI state of the CORESET corresponding to the first secondary cell.

3.2.3. According to some embodiments, the beam failure detection reference signal resource may correspond to a set $\bar{q}_0$. The set $\bar{q}_0$ may include periodic CSI-RS resources.

Specifically, the network device may configure periodic CSI-RS resources, the periodic CSI-RS resources may be used to transmit periodic CSI-RS, and the periodic CSI-RS resources may constitute the beam failure detection reference signal resource set $\bar{q}_0$.

3.3. According to some embodiments, the operation includes: at the physical layer, the terminal device stopping reporting the measurement status of the beam failure detection reference signal resource corresponding to the first secondary cell to the MAC layer. When the terminal device deactivates the secondary cell, the terminal device stops reporting the measurement status of the beam failure detection reference signal resource to the MAC layer at the same time, which can reduce the processing complexity of the terminal device, save the power consumption of the terminal device, and improve the flexibility of the terminal device implementations. For example, the terminal device can measure part of the beam failure reference signal resources according to its own power consumption and correspondence requirements, without reporting to the MAC layer.

For the meaning of the beam failure detection reference signal resource corresponding to the first secondary cell described in 3.3, reference may be made to the related description in 2.5, which will not be repeated here.

3.3.1. According to some embodiments, the beam failure detection reference signal resource may be determined according to a configuration of the network device.

3.3.1.1. According to some embodiments, the beam failure detection reference signal resource may be determined according to an RRC parameter. For example, the RRC parameter may include the indication information failureDetectionResources of the beam failure detection reference signal resource.

3.3.2. According to some embodiments, the beam failure detection reference signal resource may be determined according to the TCI state of the CORESET corresponding to the first secondary cell. For specific implementation, reference may be made to the related description in 2.5.3, which will not be repeated here.

3.3.3. According to some embodiments, the beam failure detection reference signal resource may correspond to a set $\bar{q}_0$, and the set $\bar{q}_0$ may include a periodic CSI-RS resource. For specific implementation, reference may be made to the relevant description in 2.5.4, which will not be repeated here.

3.3.4. According to some embodiments, the measurement status of the beam failure detection reference signal resource reported by the physical layer to the MAC layer may include a beam failure instance.

3.4. According to some embodiments, the operation includes: the terminal device stopping measuring a candidate beam reference signal group corresponding to the first secondary cell at the physical layer. When the terminal device deactivates the secondary cell, the measurement of the candidate beam reference signal in the candidate beam reference signal group is stopped at the same time, which can reduce the processing complexity of the terminal device and can also save the power consumption of the terminal device.

For the meaning of the candidate beam reference signal group corresponding to the first secondary cell described in 3.4, reference may be made to the related descriptions in 2.10, which will not be repeated here.

3.4.1. According to some embodiments, the candidate beam reference signal group includes one or more candidate beam reference signals.

3.4.2. According to some embodiments, the candidate beam reference signal group may be determined according to configuration from the network device.

3.4.2.1. According to some embodiments, the candidate beam reference signal group may be determined according to a Radio Resource Control (RRC) parameter.

3.4.2.1.1 The RRC parameter may include a candidate beam reference signal list (candidateBeamRSList).

3.4.3. According to some embodiments, the candidate beam reference signal group may be determined according to a CSI-RS resource identifier and/or a synchronizing signal/PBCH block (SS/PBCH block) number.

3.4.4. The resource corresponding to the candidate beam reference signal group may be one of the following three situations:

3.4.4.1. periodic CSI-RS resources;

3.4.4.2. SS/PBCH block;

3.4.4.3. periodic CSI-RS resources and SS/PBCH block.

3.5. According to some embodiments, the operation includes: at the physical layer, stopping reporting the measurement status of the candidate beam reference signal in the candidate beam reference signal group corresponding to the first secondary cell to the MAC. When the terminal device deactivates the secondary cell, reporting of the measurement status of the candidate beam reference signal in the candidate beam reference signal group to the MAC layer is stopped at the same time, which can reduce the processing complexity of the terminal device, save the power consumption of the terminal device, and improve the flexibility of terminal device implementations. For example, the terminal device can measure some candidate beam reference signals according to its own power consumption and correspondence requirements, without reporting to the MAC layer.

For the meaning of the candidate beam reference signal group corresponding to the first secondary cell in 3.5, reference may be made to the related description in 2.10, which will not be repeated here.

3.5.1. According to some embodiments, the measurement status of the candidate beam reference signal in the candidate beam reference signal group by the terminal device may include:

information (for example, identifier of the reference signal) of a target candidate beam reference signal whose link quality satisfies a first condition, and/or a measurement result corresponding to the target candidate beam reference signal, for example, RSRQ or RSRP and so on.

3.5.1.1. The link quality corresponding to the candidate beam reference signal satisfying the first condition includes that the link quality corresponding to the candidate beam reference signal is greater than a first threshold, or greater than or equal to the first threshold.

3.5.1.1.1. According to some embodiments, the first threshold is configured by the network device.

3.5.2. According to some embodiments, the candidate beam reference signal group includes one or more candidate beam reference signals.

3.5.3. According to some embodiments, the candidate beam reference signal group may be determined according to a configuration of the network device.

3.5.3.1 According to some embodiments, the candidate beam reference signal group may be determined according to an RRC parameter.

3.5.3.1.1. The RRC parameter may include a candidate beam reference signal list (candidateBeamRSList).

3.5.4. According to some embodiments, the candidate beam reference signal group may be determined according to a CSI-RS resource identifier and/or a synchronization signal block/PBCH block (SS/PBCH block) number.

3.5.5. According to some embodiments, the resource corresponding to the candidate beam reference signal group may be one of the following three situations:

3.5.5.1. periodic CSI-RS resources;
3.5.5.2. SS/PBCH block;
3.5.5.3. periodic CSI-RS resources and SS/PBCH block.

Further, after the first secondary cell is deactivated, operations on the first secondary cell may include at least one of the following:

4.1. not transmitting Sounding Reference Signal (SRS) on the first secondary cell;

4.2. not transmitting uplink data (for example, Uplink Shared Channel, UL-SCH) on the first secondary cell;

4.3. not transmitting Random Access Channel RACH) on the first secondary cell;

4.4. not transmitting Physical Uplink Control Channel (PUCCH) on the first secondary cell;

4.5. not monitoring Physical Downlink Control Channel (PDCCH) on the first secondary cell;

4.6. not reporting Channel State Information (CSI) corresponding to the first secondary cell;

4.7. not monitoring the PDCCH for the first secondary cell; in this case, the PDCCH may be sent on the first secondary cell or may be sent on other cells;

4.8. optionally, not detecting the beam failure detection reference signal corresponding to the BFR procedure corresponding to the first secondary cell, or not detecting the beam failure detection reference signal resource corresponding to the BFR procedure corresponding to the first secondary cell;

4.9. optionally, not detecting the candidate beam reference signal corresponding to the BFR procedure corresponding to the first secondary cell, or not detecting the candidate beam reference signal resource corresponding to the BFR procedure corresponding to the first secondary cell;

4.10. optionally, not transmitting the PUCCH corresponding to the BFR procedure for the first secondary cell;

4.11. optionally, not transmitting the MAC CE corresponding to the BFR procedure for the first secondary cell;

4.12. optionally, not transmitting the UL-SCH corresponding to the BFR procedure for the first secondary cell;

4.13. optionally, cancelling or suspending the operations corresponding to the BFR procedure corresponding to the first secondary cell, and the operations including one or more of the above operations.

It should be understood that the first embodiment of the present disclosure can also be applied to the scenario of deactivating a BWP. For example, when a first BWP is deactivated, the similar operation of canceling or suspending the BFR corresponding to the first secondary cell in the first embodiment can be used to cancel or suspend the operation of the BFR corresponding to the first BWP, for example, the measurement of the beam failure detection reference signal resource corresponding to the first BWP is stopped.

Therefore, according to the wireless communication method of embodiments of the present disclosure, the terminal device can stop or suspend the beam failure recovery procedure corresponding to the secondary cell or BWP at the same time when the secondary cell or BWP is deactivated, which can avoid the waste of system resources and the consumption of processing power of the terminal device and improve system performance. Further, the activation and deactivation procedure of the secondary cell or BWP is combined with the beam failure recovery procedure, which can reduce the implementation complexity of the terminal device and improve the BFR efficiency.

Second Embodiment

In the embodiment of the present disclosure, the terminal device may be configured with one or more secondary cells. Specifically, the media access control MAC layer entity of the terminal device may be configured with one or more secondary cells. The one or more secondary cells may include a first secondary cell. If the first secondary cell is in a deactivated state, the terminal device may activate the first secondary cell. For example, the terminal device may activate the first secondary cell according to activation signaling of the network device. Further, the terminal device may start or continue BFR related operations corresponding to the first secondary cell when the first secondary cell is activated. It should be understood that the BFR operation corresponding to the first secondary cell in the case of activating the first secondary cell and the BFR operation corresponding to the first secondary cell in the case of deactivating the first secondary cell corresponds to each other, and for similar descriptions, reference may be made to the foregoing embodiments, which will not be repeated here.

FIG. 3 is a schematic flowchart of a wireless communication method according to a second embodiment of the present disclosure. The method 300 may be performed by the terminal device in the communication system shown in FIG. 1. As shown in FIG. 3, the method 300 may include at least part of the following contents:

In S310, the terminal device starts an operation of Beam Failure Recovery (BFR) corresponding to a first secondary cell or continues a suspended operation of the BFR corresponding to the first secondary cell in response to activation of the first secondary cell.

In embodiments of the present disclosure, the terminal device activates the first secondary cell according to network signaling.

According to some embodiments, the network signaling may be MAC CE signaling, which is used to indicate activation of the first secondary cell. Or, the network signaling may be other dynamic signaling, such as Downlink Control Information (DCI).

According to some embodiments, the network signaling includes second BFR indication information. The second BFR indication information is used to indicate that the network signaling is also used to trigger starting or continuing of the BFR related operations corresponding to the first secondary cell. Further, the terminal device may start or continue the BFR related operations corresponding to the first secondary cell when the second BFR indication information indicates that the network signaling is also used to start or continue the BFR related operations corresponding to the first secondary cell.

Further, the terminal device performs at least one of the following operations for the first secondary cell.

5.1. The method is performed in the MAC entity of the terminal device.

5.2. The method includes: the terminal device activating the first secondary cell according to a certain time sequence.

For example, the terminal device periodically activates the first secondary cell.

5.3. The method includes: performing normal operations on the SCell. For example, at least one of the following operations may be performed:

5.3.1. optionally, transmitting SRS on the first secondary cell;

5.3.2. optionally, monitoring PDCCH on the first secondary cell;

5.3.4. optionally, transmitting PUCCH transmission on the first secondary cell;

5.3.5. optionally, reporting the CSI for the first secondary cell; and 5.3.6. optionally, monitoring PDCCH for the first secondary cell.

5.4. According to some embodiments, the terminal device performs related operations of the BFR corresponding to the first secondary cell. For example, the related operations of the BFR corresponding to the first secondary cell may be started or the suspended related operations of the BFR corresponding to the first secondary cell may be resumed.

5.4.1. According to some embodiments, the operation is for an active BWP or activated BWP corresponding to the first secondary cell.

Specifically, at least one of the following operations may be included:

5.5. According to some embodiments, the operation may include: resetting or continuing the counting of beam failure instances corresponding to the first secondary cell.

For example, resetting the counting of beam failure instances may be resetting the counting of beam failure instances to 0 or other initial value. Resetting the counting of beam failure instances (BFIs) facilitates the implementations of the terminal device and avoids occupation of resources for maintaining the beam failure instance related information by the terminal device after deactivating the secondary cell. Continuing the counting of beam failure instances may include continuing the count value of the beam failure instances that has been suspended, that is, the counting is continued from the suspended count value without resetting to 0. Optionally, if the link quality before and after activation of the first secondary cell may not change, continuing the previous BFR procedure can speed up the BFR procedure and reduce the BFR delay.

5.5.1. According to some embodiments, the counting is performed using a beam failure instance counter (BFI_COUNTER).

5.5.2 According to some embodiments, the operation is for the active BWP corresponding to the first secondary cell.

5.6. According to some embodiments, the operation includes: starting, restarting, or continuing a timer used for counting beam failure instances corresponding to the first secondary cell. When the secondary cell is activated, the timer used for counting beam failure instances is started, and the link quality of the first secondary cell is calculated, which is beneficial to using a better link for data transmission and improving system performance.

5.6.1. According to some embodiments, the timer is a beam failure detection timer (beamFailureDetectionTimer).

5.6.2. According to some embodiments, the operation is for an active BWP corresponding to the first secondary cell.

5.7. According to some embodiments, the operation includes: at the physical layer, measuring, by the terminal device, the beam failure detection reference signal resource corresponding to the first secondary cell. When the terminal device activates the secondary cell, the terminal device also starts to measure the beam failure detection reference signal on the beam failure detection reference signal resource, that is, starts to perform the BFR procedure corresponding to the first secondary cell, which can improve system performance.

5.7.1. According to some embodiments, the operation is for an active BWP corresponding to the first secondary cell.

5.7.2. According to some embodiments, the terminal device at the MAC notifies the physical layer to measure the beam failure detection reference signal resource. That is, the physical layer may start to measure the beam failure detection reference signal on the beam failure detection reference signal resource based on the notification of the MAC layer.

5.7.3. According to some embodiments, the beam failure detection reference signal resource may be determined according to a configuration of the network device.

5.7.3.1. According to some embodiments, the beam failure detection reference signal resource may be determined according to an RRC parameter.

For example, the RRC parameter may include indication information (failureDetectionResources) of the beam failure detection reference signal resource.

5.7.4. According to some embodiments, the beam failure detection reference signal resource may be determined according to the TCI state of the CORESET corresponding to the first secondary cell.

5.7.5. According to some embodiments, the beam failure detection reference signal resource may correspond to a set $\bar{q}_0$, and the set $\bar{q}_0$ may include periodic CSI-RS resources.

5.8. According to some embodiments, the operation includes: at the physical layer, reporting, by the terminal device, to the MAC layer the measurement status of the beam failure detection reference signal resource corresponding to the first secondary cell. When the terminal device activates the secondary cell, the physical layer starts to report the measurement status of the beam failure detection reference signal on the beam failure detection reference signal resource, that is, starts to perform the BFR procedure corresponding to the first secondary cell, which can improve system performance.

According to some embodiments, the terminal device may at the physical layer report the measurement status of the beam failure detection reference signal resource corresponding to the first secondary cell to the MAC layer when a specific condition is met.

According to some embodiments, the specific condition may be that the measurement result of the beam failure detection reference signal satisfies a certain condition (for example, the channel quality is less than a threshold). The measurement result of the beam failure detection reference signal satisfying a certain condition can be considered as a beam failure instance.

5.8.1. According to some embodiments, the measurement status of the beam failure detection reference signal resource reported by the physical layer to the MAC layer may include a beam failure instance.

According to some embodiments, the measurement status of the beam failure detection reference signal resource may further include the measurement result of the beam failure reference signal, such as RSRQ, RSRP, and so on; or, may further include the cumulative number of beam failure instances, that is, the number of times the measurement result of the beam failure detection reference signal resource meets a certain condition.

5.8.2. According to some embodiments, the operation is for an active BWP corresponding to the first secondary cell.

5.8.3. According to some embodiments, the terminal device at the MAC layer notifies the physical layer to report the measurement status of the beam failure detection reference signal resource to the MAC layer. That is, the physical layer may start to report the measurement status of the beam failure detection reference signal on the beam failure detection reference signal resource to the MAC layer based on the notification of the MAC layer.

5.8.4. According to some embodiments, the beam failure detection reference signal resource may be determined according to a configuration of the network device.

5.8.4.1. According to some embodiments, the beam failure detection reference signal resource may be determined according to an RRC parameter.

For example, the RRC parameter may include indication information (failureDetectionResources) of the beam failure detection reference signal resource.

5.8.5. According to some embodiments, the beam failure detection reference signal resource may be determined according to the TCI state of the CORESET corresponding to the first secondary cell.

5.8.6. According to some embodiments, the beam failure detection reference signal resource may correspond to a set $\bar{q}_0$, and the set $\bar{q}_0$ may include periodic CSI-RS resources.

5.9. According to some embodiments, the operation includes: at the MAC layer, receiving, by the terminal device, the measurement status of the beam failure detection reference signal resource corresponding to the first secondary cell reported by the physical layer. When the terminal device activates the secondary cell, the MAC layer starts to receive the measurement status of the beam failure detection reference signal on the beam failure detection reference signal resource, that is, starts to perform the BFR procedure corresponding to the first secondary cell, which can improve system performance.

5.9.1. According to some embodiments, the above operation is for an active BWP corresponding to the first secondary cell.

5.9.2. According to some embodiments, the measurement status of the beam failure detection reference signal resource includes a beam failure instance.

5.10. According to some embodiments, the operation includes: at the physical layer, measuring, by the terminal device, a candidate beam reference signal group corresponding to the first secondary cell. When the terminal device activates the secondary cell, the physical layer starts to measure the candidate beam reference signal resources, that is, starts to perform the BFR procedure corresponding to the first secondary cell, which can improve system performance.

5.10.1. According to some embodiments, the candidate beam reference signal group includes one or more candidate beam reference signals.

5.10.2. According to some embodiments, the candidate beam reference signal group may be determined according to a configuration of the network device.

5.10.2.1. According to some embodiments, the candidate beam reference signal group may be determined according to an RRC parameter.

For example, the RRC parameter may include a candidate beam reference signal list (candidateBeamRSList).

For example, the network device may configure a candidateBeamRSList for the terminal device, and the candidate beam reference signals in the candidateBeamRSList may be used by the terminal device to perform measurements to select a new candidate beam.

According to some embodiments, the candidateBeamRSList may be configured by the network device through higher layer signaling.

5.10.3. According to some embodiments, the candidate beam reference signal group may be determined according to a CSI-RS resource identifier and/or a synchronization signal block (SS/PBCH block) number. According to some embodiments, the CSI-RS resource identifier and/or the SS/PBCH block number may be configured by the network device.

5.10.4. According to some embodiments, the resource corresponding to the candidate beam reference signal group may include one of the following three situations:

5.10.4.1. periodic CSI-RS resources;
5.10.4.2. SS/PBCH block;
5.10.4.3. periodic CSI-RS resources and SS/PBCH block.

5.10.5. According to some embodiments, the MAC layer notifies the physical layer to measure candidate beam reference signals in the candidate beam reference signal group. That is, the physical layer may start the measurement of the candidate beam reference signals in the candidate beam reference signal group based on the notification of the MAC layer.

5.10.6. According to some embodiments, the above operations are for an active BWP corresponding to the first secondary cell.

5.11. According to some embodiments, the operation includes: at the physical layer, reporting, by the terminal device, the measurement status of the candidate beam reference signals in the candidate beam reference signal group corresponding to the first secondary cell to the MAC layer. When the terminal device activates the secondary cell, the physical layer starts to report the measurement status of the candidate beam reference signal resources to the MAC layer, that is, starts to perform the BFR procedure corresponding to the first secondary cell, which can improve system performance.

5.11.1. According to some embodiments, the measurement status of the candidate beam reference signals in the candidate beam reference signal group by the terminal device may include:

information (for example, identifier of the reference signal) of a target candidate beam reference signal whose link quality satisfies a first condition, and/or a measurement result corresponding to the target candidate beam reference signal, for example, RSRQ or RSRP and so on.

5.11.1.1. The link quality corresponding to the candidate beam reference signal satisfying the first condition includes that the link quality corresponding to the candidate beam reference signal is greater than a first threshold, or greater than or equal to the first threshold.

5.11.1.2 According to some embodiments, the first threshold is configured by the network device.

5.11.2. According to some embodiments, the candidate beam reference signal group may be determined according to a configuration of the network device.

5.11.2.1 According to some embodiments, the candidate beam reference signal group may be determined according to an RRC parameter. For specific implementations, refer to the related description of 2.10.2.1, which will not be repeated here.

5.11.3. According to some embodiments, the candidate beam reference signal group may be determined according to a CSI-RS resource identifier and/or a SS/PBCH block number.

5.11.4. According to some embodiments, the resource corresponding to the candidate beam reference signal group may include one of the following three situations:

5.11.4.1. periodic C SI-RS resources;

5.11.4.2. SS/PBCH block;

5.11.4.3. periodic CSI-RS resources and SS/PBCH block.

5.11.5. According to some embodiments, the MAC layer notifies the physical layer to report the measurement status of the candidate beam reference signal in the candidate beam reference signal group to the MAC. That is, the physical layer may start reporting the measurement status of the candidate beam reference signal in the candidate beam reference signal group to the MAC based on the notification of the MAC layer.

5.11.6. The above operations are for an active BWP corresponding to the first secondary cell.

5.12. According to some embodiments, the operation includes: starting the BFR procedure corresponding to the first secondary cell or continuing the suspended BFR procedure corresponding to the first secondary cell (or referred to as a link recovery procedure). When the first secondary cell is reactivated, if the link quality of the first secondary cell may not change much, the previous BFR procedure can be continued, which can speed up the BFR procedure and reduce the delay.

According to some embodiments, the start of the BFR procedure or the continuation of the suspended BFR procedure may include one or more of the above operations in 5.4 to 5.11.

5.12.1. According to some embodiments, the above operations are for an active BWP corresponding to the first secondary cell.

5.12.2. According to some embodiments, a part of steps of the BFR procedure are performed on the first secondary cell.

5.12.3. According to some embodiments, a part of the steps of the BFR procedure are performed on other cell except the first secondary cell. That is, a part of the operations of the BFR procedure are performed on the first secondary cell, and other operations may be performed on other cell.

5.12.3.1 According to some embodiments, the other cell is a special cell corresponding to the secondary cell, for example, a Primary Cell (PCell) corresponding to the first secondary cell, or a Primary Secondary cell (PSCell).

5.12.4. According to some embodiments, during starting or continuing of the BFR procedure, the terminal device reports the first information to the network device through PUCCH on the other cell that the first secondary cell.

5.12.4.1. According to some embodiments, the first information is used to indicate a beam failure. For example, the beam failure may mean that the link quality corresponding to at least one secondary cell is poor enough to satisfy the second condition. For specific implementations, reference may be made to the related descriptions in 2.12.3, which will not be repeated here.

5.12.5. According to some embodiments, during starting or continuing of the BFR procedure, the terminal device reports the first information to the network device through the MAC CE on other cell than the first secondary cell. The first information may be used to indicate at least one of the following information:

5.12.5.1. According to some embodiments, the first information is used to indicate a beam failure. For specific implementations, reference may be made to previous related implementations, which will not be repeated here.

5.12.5.2. According to some embodiments, the first information is used to indicate identity information corresponding to a cell where the beam failure occurs, such as a cell ID.

5.12.5.3. According to some embodiments, the first information is used to indicate information of a new beam selected by the terminal device, for example, a beam ID. According to some embodiments, the new beam may be determined according to the candidate beam reference signal. For example, it may be determined that the beam with the best link quality corresponding to the candidate beam reference signal is the new beam, and the new beam may be used for subsequent data transmission of the terminal device.

According to some embodiments, the terminal device may also transmit the first information through PUCCH and MAC CE, for example, through PUCCH to indicate beam failure, and MAC CE to transmit the cell ID of a cell where the beam failure occurs and/or information about the new beam selected by the terminal device.

It should be understood that the terminal device may also send the first information through other activated cells than the PCell or PSCell, or may send the first information through other uplink message or uplink channel on other cells, and embodiments of the present disclosure do not impose specific limitations on this.

In some embodiments, the foregoing operations may be performed directly at the physical layer without notification from the MAC layer. In this case, the operations may include at least one of the following:

6.1. The operation is performed at the physical layer.

6.2. The operation is for an active BWP corresponding to the first secondary cell.

6.3. According to some embodiments, the operation includes: the terminal device measuring the beam failure detection reference signal resource corresponding to the first secondary cell at the physical layer. When the terminal device activates the secondary cell, the measurement of the beam failure detection reference signal on the beam failure detection reference signal resource is simultaneously started, that is, the BFR procedure corresponding to the first secondary cell is started, which can improve system performance..

6.3.1 According to some embodiments, operation is for an active BWP corresponding to the first secondary cell.

6.3.2. According to some embodiments, the beam failure detection reference signal resource may be determined according to configuration from the network device.

6.3.2.1. According to some embodiments, the beam failure detection reference signal resource may be determined according to an RRC parameter. For example, the RRC parameter may include a failure detection resource (failureDetectionResources).

6.3.3. According to some embodiments, the beam failure detection reference signal resource may be determined according to the TCI state of the CORESET corresponding to the first secondary cell.

6.3.4. According to some embodiments, the beam failure detection reference signal resource may correspond to a set $\bar{q}_0$. The set $\bar{q}_0$ may include periodic CSI-RS resources.

6.4. According to some embodiments, the operation includes: at the physical layer, the terminal device reporting the measurement status of the beam failure detection reference signal resource corresponding to the first secondary cell to the MAC layer. When the terminal device activates the secondary cell, the physical layer starts to report the measurement status of the beam failure detection reference signal on the beam failure detection reference signal resource, that is, starts to perform the BFR procedure corresponding to the first secondary cell, which can improve system performance.

According to some embodiments, the terminal device may at the physical layer report the measurement status of the beam failure detection reference signal resource to the MAC layer when a specific condition is met.

According to some embodiments, the specific condition may be that the measurement result of the beam failure detection reference signal satisfies a certain condition (for example, the channel quality is less than a threshold). The measurement result of the beam failure detection reference signal satisfying a certain condition can be considered as a beam failure instance.

6.4.1. According to some embodiments, the measurement status of the beam failure detection reference signal resource reported by the physical layer to the MAC layer may include a beam failure instance.

According to some embodiments, the measurement status of the beam failure detection reference signal resource may further include the measurement result of the beam failure reference signal, such as RSRQ, RSRP, and so on; or, may further include the cumulative number of beam failure instances, that is, the number of times the measurement result of the beam failure detection reference signal resource meets a certain condition.

6.4.2. According to some embodiments, the operation is for an active BWP corresponding to the first secondary cell.

6.4.3. According to some embodiments, the beam failure detection reference signal resource may be determined according to a configuration of the network device.

6.4.4.1. According to some embodiments, the beam failure detection reference signal resource may be determined according to an RRC parameter.

6.4.4. According to some embodiments, the beam failure detection reference signal resource may be determined according to the TCI state of the CORESET corresponding to the first secondary cell.

6.4.5. According to some embodiments, the beam failure detection reference signal resource may correspond to a set $\bar{q}_0$, and the set $\bar{q}_0$ may include a periodic CSI-RS resource.

6.5. According to some embodiments, the operation includes: the terminal device measuring a candidate beam reference signal group corresponding to the first secondary cell at the physical layer. When the terminal device activates the secondary cell, the physical layer starts to measure the candidate beam reference signal resource, that is, starts to perform the BFR procedure corresponding to the first secondary cell, which can improve system performance.

6.5.1. According to some embodiments, the candidate beam reference signal group includes one or more candidate beam reference signals.

6.5.2. According to some embodiments, the candidate beam reference signal group may be determined according to configuration from the network device.

6.5.2.1. According to some embodiments, the candidate beam reference signal group may be determined according to a Radio Resource Control (RRC) parameter. For example, the RRC parameter may include a candidate beam reference signal list (candidateBeamRSList). For example, the network device may configure candidateBeamRSList for the terminal device, and the candidate beam reference signals in the candidateBeamRSList may be used by the terminal device to measure the reference signals to select a new candidate beam. According to some embodiments, the candidateBeamRSList may be configured by the network device through higher layer signaling.

6.5.3. According to some embodiments, the candidate beam reference signal group may be determined according to a CSI-RS resource identifier and/or a SS/PBCH block number.

According to some embodiments, the CSI-RS resource identifier and/or SS/PBCH block number may be configured by the network device.

6.5.4. The resource corresponding to the candidate beam reference signal group may include one of the following three situations:

6.5.4.1. periodic CSI-RS resources;

6.5.4.2. SS/PBCH block;

6.5.4.3. periodic CSI-RS resources and SS/PBCH block.

6.5.5. According to some embodiments, the operation is for an active BWP corresponding to the first secondary cell.

6.6. According to some embodiments, the operation includes: at the physical layer, reporting by the terminal device the measurement status of the candidate beam reference signal in the candidate beam reference signal group corresponding to the first secondary cell to the MAC layer. When the terminal device activates the secondary cell, the physical layer reports the measurement status of the candidate beam reference signal resources to the MAC layer, that is, starts to perform the BFR procedure corresponding to the first secondary cell, which can improve system performance.

6.6.1. According to some embodiments, the measurement status of the candidate beam reference signal in the candidate beam reference signal group by the terminal device may include:

information (for example, identifier of the reference signal) of a target candidate beam reference signal whose link quality satisfies a first condition, and/or a measurement result corresponding to the target candidate beam reference signal, for example, RSRQ or RSRP and so on.

6.6.1.1. The link quality corresponding to the candidate beam reference signal satisfying the first condition includes that the link quality corresponding to the candidate beam reference signal is greater than a first threshold, or greater than or equal to the first threshold.

6.6.1.2. According to some embodiments, the first threshold is configured by the network device.

6.6.2. According to some embodiments, the candidate beam reference signal group may be determined according to a configuration of the network device.

6.6.2.1 According to some embodiments, the candidate beam reference signal group may be determined according to an RRC parameter. For implementations, reference may be made to related descriptions in 2.10.2.1, which will not be repeated here.

6.6.3. According to some embodiments, the candidate beam reference signal group may be determined according to a CSI-RS resource identifier and/or a synchronizing signal/PBCH block (SS/PBCH block) number.

6.6.4. According to some embodiments, the resource corresponding to the candidate beam reference signal group may be one of the following three situations:

6.6.4.1. periodic CSI-RS resources;
6.6.4.2. SS/PBCH block;
6.6.4.3. periodic CSI-RS resources and SS/PBCH block.

It should be understood that the second embodiment of the present disclosure can also be applied to the scenario of activating an BWP. For example, when a first BWP is activated, the similar operations of starting or continuing the BFR corresponding to the first secondary cell in the second embodiment can be used to start or continue the operations of the BFR corresponding to the first BWP, for example, measuring the beam failure detection reference signal resource corresponding to the first BWP, and so on.

Therefore, according to the wireless communication method of the embodiments of the present disclosure, the terminal device can start or continue the beam failure recovery procedure corresponding to the secondary cell or the BWP at the same time when activating the BWP of the secondary cell, which can performing statistics on the link quality of the secondary cell or BWP, is helpful for terminal device to use a suitable secondary cell or BWP for data transmission, and can improve system performance. Further, the activation and deactivation procedures of the secondary cell or BWP is combined with the beam failure recovery procedure, which can reduce the complexity of terminal device implementations and can improve the efficiency of BFR.

Third Embodiment

In the embodiment of the present disclosure, the terminal device may be configured with one or more secondary cells. Specifically, the media access control (MAC) layer entity of the terminal device may be configured with one or more secondary cells. The one or more secondary cells may include a first secondary cell. If the first secondary cell is in the deactivated state, the terminal device may activate the first secondary cell. Further, the terminal device may start or continue the BFR related operations corresponding to the first secondary cell in the case that the first secondary cell is activated. Further, the terminal device may determine the corresponding processing operation of the first secondary cell according to the execution status of the BFR procedure.

It should be understood that the BFR operations in the third embodiment correspond to the BFR operations in the foregoing first and second embodiments. For similar descriptions, reference may be made to the foregoing embodiments, and details are not repeated here.

FIG. 4 is a schematic flowchart of a wireless communication method according to a third embodiment of the present disclosure. The method 400 may be performed by the terminal device in the communication system shown in FIG. 1. As shown in FIG. 4, the method 400 may include at least part of the following content:

In S410, the terminal device performs corresponding processing on a first secondary cell according to an execution status of Beam Failure Recovery (BFR) corresponding to the first secondary cell.

After the terminal device initiates the beam failure recovery procedure on the first secondary cell, the terminal device may determine the subsequent processing operation for the first secondary cell according to the execution status of the beam failure recovery procedure. In the following, the specific implementations will be described in 7.1-7.4.

7.1. According to some embodiments, if the BFR corresponding to the first secondary cell fails, the terminal device may deactivate the first secondary cell.

The failure of the BFR procedure corresponding to the first secondary cell indicates that the link quality of the first secondary cell is poor. Therefore, deactivating the first secondary cell can avoid the consumption of processing capacity and power consumption of the terminal device which may affect the terminal device's normal data transmission.

According to some embodiments, the terminal device may report first information to the network device, and the terminal device may determine whether the BFR procedure corresponding to the first secondary cell is successful according to a response for the first information.

7.1.1. According to some embodiments, if the first information corresponding to the first secondary cell is transmitted through PUCCH, and the terminal device does not receive a network response corresponding to the first information within a first time period after transmitting the first information, the terminal device determines that the BFR procedure corresponding to the first secondary cell fails.

The terminal device controls the time delay of the BFR procedure by the time period, which is simple and easy to implement, and can obtain stable performance.

It should be understood that the first information corresponding to the first secondary cell may refer to the first information sent by the first secondary cell through other cell. When the terminal device does not receive the network response for the first information corresponding to the first secondary cell within a certain period of time, it can be determined that the BFR procedure corresponding to the first secondary cell fails. Whether the BFR procedure corresponding to other cells is successful can be determined according to the reception status of the network response for the first information corresponding to the other cells.

According to some embodiments, the network response corresponding to the first information may include a cell ID, which is used to indicate which cell that sends the first information that the network response corresponds to. Alternatively, the network response may be transmitted on a specific resource, or may be scrambled in a specific manner to indicate the cell which the network response corresponds to. Therefore, according to the network response, the terminal device can determine which cell sends the first information that the response corresponds to.

7.1.1.1. According to some embodiments, the first time period may be configured by a network device, or predefined or preset.

7.1.2. According to some embodiments, if the first information corresponding to the first secondary cell is transmitted through PUCCHs multiple times, no network response corresponding to the first information is received, and the number of PUCCH transmissions reaches a preset condition, it can be determined that the BFR corresponding to the first secondary cell fails.

Controlling the BFR procedure through the number of PUCCH transmissions can realize flexible network scheduling or processing, and improve the flexibility of the communication system.

7.1.2.1. According to some embodiments, that the number of transmissions of the PUCCH reaching a preset condition may include that the number of transmissions of the PUCCH is greater than a first number threshold, or greater than or equal to a first number threshold.

According to some embodiments, the first number threshold is configured by a network device, or pre-configured, or pre-defined.

For example, the network device may configure the first number threshold for the terminal device through RRC signaling or DCI.

7.1.3. If the first information corresponding to the first secondary cell is transmitted through MAC CE, and the terminal device does not receive the network response for the first information within a second time period after transmitting the first information, it is determined that the BFR procedure corresponding to the first secondary cell fails. Controlling the time delay of the BFR procedure by the time period is simple and easy to implement, and stable performance can be obtained.

7.1.3.1. According to some embodiments, the second time period may be configured by a network device or pre-configured.

7.1.3.2. According to some embodiments, the network response corresponding to the first information is an Acknowledged (ACK) signal corresponding to the MAC CE transmission.

7.1.4. According to some embodiments, if the first information corresponding to the first secondary cell is transmitted through MAC CE, and the terminal device receives the ACK signal corresponding to the MAC CE, and the terminal device does not receive the network response corresponding to the first information within a third period of time after the first information is transmitted, it is determined that the BFR procedure corresponding to the first secondary cell fails.

7.1.4.1. According to some embodiments, the third period of time may be configured by a network device or pre-configured.

7.1.5. According to some embodiments, if the first information corresponding to the first secondary cell is transmitted through MAC CE multiple times, no network response corresponding to the first information is received, and the number of transmissions of the MAC CE reaches a preset condition, it is determined that the BFR corresponding to the first secondary cell fails. Controlling the BFR procedure by the number of MAC CE transmissions can realize flexible network scheduling or processing, and improve the flexibility of the communication system.

7.1.5.1 According to some embodiments, that the number of transmissions of the MAC CE reaching a preset condition may include that the number of transmissions of the MAC CE is greater than a second number threshold, or greater than or equal to a second number threshold.

According to some embodiments, the second number threshold is configured by a network device, or is pre-configured.

For example, the network device may configure the second number threshold for the terminal device through RRC signaling or DCI.

7.2. According to some embodiments, if the BFR corresponding to the first secondary cell is successful, the terminal device restarts a secondary cell deactivation timer corresponding to the first secondary cell, that is, sCellDeactivationTimer.

If the BFR corresponding to the first secondary cell is successful, it indicates that the link quality of the first secondary cell is restored. In this case, the terminal device starts or restarts the deactivation timer for the first secondary cell, that is, keep the first secondary cell in the activated state for subsequent transmission of new data while avoiding repeated activation/deactivation of the secondary cell.

7.3. According to some embodiments, if the first information corresponding to the first secondary cell is being transmitted through the MAC CE, the terminal device restarts the secondary cell deactivation timer corresponding to the first secondary cell, that is, sCellDeactivationTimer.

When the first information is being transmitted, restarting the deactivation timer corresponding to the first secondary cell can ensure the normal transmission of the first information to complete the BFR procedure corresponding to the first secondary cell, and can provide reference information as to whether to activate/deactivate the first secondary cell subsequently, so as to improve system performance. For example, if the BFR corresponding to the first secondary cell is successful, it means that the link quality of the first secondary cell is good. When there is subsequent data to be transmitted, the first secondary cell can be directly activated (when the first secondary cell is in a deactivated state). Alternatively, if the BFR corresponding to the first secondary cell fails, it means that the link quality of the first secondary cell is not good. Whether the first secondary cell needs to be activated later may be determined by considering this BFR failure event.

Optionally, for the contents indicated by the first information and the transmission mode of the first information, reference may be made to the related description of the foregoing embodiments, which will not be repeated here.

7.4. According to some embodiments, the method includes: if the first information corresponding to the first secondary cell is being transmitted through the PUCCH, the terminal device restarting the secondary cell deactivation timer corresponding to the first secondary cell, i.e., sCellDeactivationTimer.

When the first information is being transmitted, restarting the deactivation timer corresponding to the first secondary cell can ensure the normal transmission of the first information to complete the BFR procedure corresponding to the first secondary cell, and can provide reference information as to whether to activate/deactivate the first secondary cell, so as to improve system performance. For example, if the BFR corresponding to the first secondary cell is successful, it indicates that the link quality of the first secondary cell is good. When there is subsequent data to be transmitted, the first secondary cell can be directly activated (when the first secondary cell is in the deactivated state). Alternatively, if the BFR corresponding to the first secondary cell fails, it indicates that the link quality of the first secondary cell is not good. Whether the first secondary cell needs to be activated later may be determined by considering this BFR failure event.

Optionally, for the contents indicated by the first information and the transmission mode of the first information, reference may be made to the related description of the foregoing embodiments, which will not be repeated here.

Optionally, in the third embodiment, if the first secondary cell is in the activated state, the terminal device may deactivate one of the first secondary cells according to network signaling or conditions of a timer. For specific implementations, please refer to the related implementations in 2.1-2.4, which will not be repeated here.

It should be understood that the third embodiment of the present disclosure can also be applied to the BWP scenario. For example, corresponding processing of a BWP can be performed according to the execution status of the BFR operation corresponding to the BWP. For example, if the BFR corresponding to the BWP fails, the BWP can be deactivated, or, if the BFR corresponding to the BWP succeeds, a timer corresponding to the BWP can be restarted.

Therefore, according to the wireless communication method of the embodiments of the present disclosure, the terminal device can determine the subsequent operation of the secondary cell or BWP according to the execution status of the beam failure recovery procedure corresponding to the secondary cell or BWP. For example, if the BFR procedure corresponding to the secondary cell or BWP fails, the secondary cell or BWP may be deactivated, which can avoid wasting of system resources and consumption of the processing power of terminal device, and improve system performance. Alternatively, if the BFR procedure corresponding to the secondary cell or BWP is successful, the terminal device may continue to use the secondary cell or BWP for data transmission, which can avoid repeated activation or deactivation of the secondary cell or BWP, and improve system performance.

The method embodiments of the present disclosure are described in detail above with reference to FIGS. 2 to 4, and the device embodiments of the present disclosure will be described in detail below with reference to FIGS. 5 to 9. It should be understood that the device embodiments and the method embodiments correspond to each other and for similar descriptions, please refer to the descriptions regarding the method embodiments.

Figure 5:
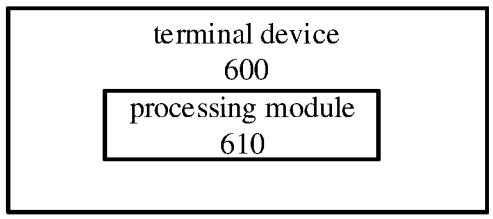
FIG. 5 is a schematic block diagram of a terminal device according to an embodiment of the present disclosure.

FIG. 5 is a schematic block diagram of a terminal device 500 according to an embodiment of the present disclosure. As shown in FIG. 5, the terminal device 500 includes a processing module 510.

The processing module 510 is configured to cancel or suspend an operation of Beam Failure Recovery (BFR) corresponding to a first secondary cell in response to deactivation of the first secondary cell.

In some embodiments, the processing module 510 is configured to:

deactivate the first secondary cell according to deactivation signaling from a network device or a deactivation timer for the first secondary cell.

In some embodiments, the processing module 510 is configured to:

at a physical layer, stop measuring a beam failure detection reference signal resource corresponding to the first secondary cell.

In some embodiments, the processing module 510 is further configured to:

at a Media Access Control (MAC) layer, notify the physical layer to stop measuring the beam failure detection reference signal resource.

In some embodiments, the processing module 510 is configured to:

at a physical layer, stop reporting a measurement status of a beam failure detection reference signal resource corresponding to the first secondary cell to a Media Access Control (MAC) layer; and/or at the MAC layer, stop receiving the measurement status of the beam failure detection reference signal resource corresponding to the first secondary cell reported by the physical layer.

In some embodiments, the processing module 510 is further configured to:

at the MAC layer, notify the physical layer to stop reporting the measurement status of the beam failure detection reference signal resource to the MAC layer.

In some embodiments, the measurement status of the beam failure detection reference signal resource is a beam failure instance.

In some embodiments, the beam failure detection reference signal resource is determined according to a configuration of a network device.

In some embodiments, the beam failure detection reference signal resource is determined according to a Radio Resource Control (RRC) parameter.

In some embodiments, the RRC parameter includes indication information of the beam failure detection reference signal resource.

In some embodiments, the beam failure detection reference signal resource is determined according to Transmission Configuration Indicator (TCI) state of a Control Resource Set (CORESET) corresponding to the first secondary cell.

In some embodiments, the beam failure detection reference signal resource corresponds to a set $\bar{q}_0$, and the set $\bar{q}_0$ includes a periodic Channel State Information Reference Signal (CSI-RS) resource.

In some embodiments, the processing module 510 is further configured to:

stop a first timer used for counting beam failure instances corresponding to the first secondary cell.

In some embodiments, the first timer is a beam failure detection timer.

In some embodiments, the processing module 510 is further configured to:

suspend or reset counting of beam failure instances corresponding to the first secondary cell.

In some embodiments, resetting the counting of the beam failure instances includes: setting a count value of the beam failure instances to zero.

In some embodiments, the processing module 510 is further configured to:

stop measurement of a candidate beam reference signal in a candidate beam reference signal group corresponding to the first secondary cell at a physical layer.

In some embodiments, the processing module 510 is further configured to:

at a MAC layer, notifying, by the terminal device, the physical layer to stop measurement of the candidate beam reference signal in the candidate beam reference signal group.

In some embodiments, the processing module 510 is further configured to:

at a physical layer, stop reporting a measurement status of a candidate beam reference signal in a candidate beam reference signal group corresponding to the first secondary cell to a MAC layer; and/or at the MAC layer, stop receiving the measurement status of the candidate beam reference signal in the candidate beam reference signal group corresponding to the first secondary cell reported by the physical layer.

In some embodiments, the processing module 510 is further configured to:

at the MAC layer, notifying by the terminal device the physical layer to stop reporting the measurement status of the candidate beam reference signal in the candidate beam reference signal group.

In some embodiments, the measurement status of the candidate beam reference signal in the candidate beam reference signal group includes:

information of a target candidate beam reference signal whose link quality satisfies a first condition, and/or a measurement result of the target candidate beam reference signal.

In some embodiments, satisfying the first condition by the link quality corresponding to the candidate beam reference signal includes:

the link quality corresponding to the candidate beam reference signal being greater than a first threshold, or the link quality corresponding to the candidate beam reference signal being greater than or equal to the first threshold.

In some embodiments, the first threshold is configured by a network device.

In some embodiments, a resource of the candidate beam reference signal corresponds to a set $\bar{q}_1$, and the set $\bar{q}_1$ includes a periodic CSI-RS resource.

In some embodiments, the candidate beam reference signal group is determined according to a configuration of a network device.

In some embodiments, the candidate beam reference signal group is determined according to an RRC parameter.

In some embodiments, the RRC parameter includes a candidate beam reference signal list.

In some embodiments, signal resources corresponding to the candidate beam reference signal group include periodic CSI-RS resources and/or SS/PBCH block resources.

In some embodiments, the processing module 510 is further configured to:

stop or reset a BFR timer corresponding to the first secondary cell.

In some embodiments, the processing module 510 is further configured to:

when first information is reported to a network device, or after the first information is reported to the network device, start the BFR timer.

In some embodiments, the processing module 510 is further configured to:

stop monitoring of a response of the network device for the first information reported by the terminal device.

In some embodiments, the BFR timer is used for the terminal device to wait for a response of the network device for the first information reported by the terminal device.

In some embodiments, the first information is transmitted through a PUCCH in a cell other than the first secondary cell.

In some embodiments, the first information is used to indicate a beam failure.

In some embodiments, the beam failure indicates that a link quality of at least one secondary cell satisfies a second condition.

In some embodiments, the second condition includes that a cumulative number of beam failure instances corresponding to the at least one secondary cell is greater than a second threshold, or the cumulative number of the beam failure instances corresponding to the at least one secondary cell is greater than or equal to the second threshold.

In some embodiments, the first information is transmitted by Media Access Control Control Element (MAC CE) in a cell other than the first secondary cell.

In some embodiments, the first information is used to indicate at least one of the following:

a beam failure, identity information of a cell where the beam failure occurs, and identity information of a candidate beam selected by the terminal device.

In some embodiments, the beam failure indicates that a link quality of at least one secondary cell satisfies a second condition.

In some embodiments, the second condition includes that a cumulative number of beam failure instances correspond to the at least one secondary cell is greater than a first number threshold, or the cumulative number of beam failure instances corresponding to the at least one secondary cell is greater than or equal to the first number threshold.

In some embodiments, the cell other than the first secondary cell is a primary cell or a primary secondary cell.

In some embodiments, a part of the operation of the BFR is performed on the first secondary cell.

In some embodiments, a part of the operation of the BFR is performed on a cell other than the first secondary cell.

In some embodiments, the cell other than the first secondary cell is a primary cell or a primary secondary cell corresponding to the first secondary cell.

In some embodiments, the operation of the BFR is for an activate Bandwidth Part (BWP) of the first secondary cell.

In some embodiments, the deactivation signaling includes first BFR indication information, and the first BFR indication information is used to indicate that the deactivation signaling is further used to trigger cancellation or suspending of the operation of BFR.

It should be understood that the terminal device 500 according to the embodiments of the present disclosure may correspond to the terminal device in the method embodiments of the present disclosure, and the above and other operations and/or functions of each unit in the terminal device 500 are configured to implement corresponding processes performed by the terminal device in the method 200 shown in FIG. 2. For the sake of brevity, repeated descriptions are omitted here.

Figure 6:
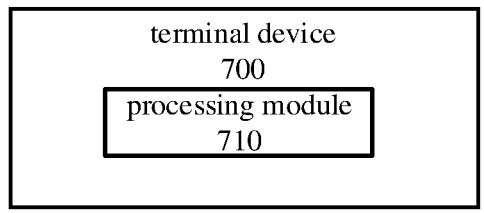
FIG. 6 is a schematic block diagram of a terminal device according to an embodiment of the present disclosure.

FIG. 6 is a schematic block diagram of a terminal device 600 according to an embodiment of the present disclosure. As shown in FIG. 6, the terminal device 600 includes a processing module 610.

The processing module 610 is configured to start an operation of Beam Failure Recovery (BFR) corresponding to a first secondary cell or continue a suspended operation of the BFR corresponding to the first secondary cell in response to activation of the first secondary cell.

In some embodiments, the processing module 610 is configured to:

measure a beam failure detection reference signal resource corresponding to the first secondary cell at a physical layer.

In some embodiments, the processing module 610 is further configured to:

at a Media Access Control (MAC) layer, notify the physical layer to measure the beam failure detection reference signal resource.

In some embodiments, the processing module 610 is further configured to:

at a physical layer, report a measurement status of a beam failure detection reference signal resource corresponding to the first secondary cell to a MAC layer; and/or at the MAC layer, receive the measurement status of the beam failure detection reference signal resource corresponding to the first secondary cell reported by the physical layer.

In some embodiments, the processing module 610 is further configured to:

at the MAC layer, notify the physical layer to report the measurement status of the beam failure detection reference signal resource to the MAC layer.

In some embodiments, the measurement status of the beam failure detection reference signal resource is a beam failure instance.

In some embodiments, the beam failure detection reference signal resource is determined according to a configuration of a network device.

In some embodiments, the beam failure detection reference signal resource is determined according to a Radio Resource Control (RRC) parameter.

In some embodiments, the RRC parameter includes indication information of the beam failure detection reference signal resource.

In some embodiments, the beam failure detection reference signal resource is determined according to Transmission Configuration Indicator (TCI) state of a Control Resource Set (CORESET) corresponding to the first secondary cell.

In some embodiments, the beam failure detection reference signal resource corresponds to a set $\bar{q}_0$ and the set $\bar{q}_0$ includes a periodic Channel State Information Reference Signal (CSI-RS) resource.

In some embodiments, the processing module 610 is further configured to:

start, restart, or continue a first timer used for counting beam failure instances.

In some embodiments, the first timer is a beam failure detection timer.

In some embodiments, the processing module 610 is further configured to:

reset or continue counting of beam failure instances.

In some embodiments, resetting the counting of the beam failure instances includes: setting a count value of the beam failure instances to zero.

In some embodiments, the processing module is further configured to:

measure a candidate beam reference signal in a candidate beam reference signal group at a physical layer.

In some embodiments, the processing module 610 is further configured to:

at a MAC layer, notify the physical layer to measure the candidate beam reference signal in the candidate beam reference signal group.

In some embodiments, the processing module 610 is further configured to:

at a physical layer, report a measurement status of a candidate beam reference signal in a candidate beam reference signal group corresponding to the first secondary cell to a MAC layer; and/or at the MAC layer, receive the measurement status of the candidate beam reference signal in the candidate beam reference signal group corresponding to the first secondary cell reported by the physical layer.

In some embodiments, the processing module 610 is further configured to:

at the MAC layer, notify the physical layer to report the measurement status of the candidate beam reference signal in the candidate beam reference signal group.

In some embodiments, the measurement status of the candidate beam reference signal in the candidate beam reference signal group includes:

information of a target candidate beam reference signal whose link quality satisfies a first condition, and/or a measurement result of the target candidate beam reference signal.

In some embodiments, satisfying the first condition by the link quality corresponding to the candidate beam reference signal includes:

the link quality corresponding to the candidate beam reference signal being greater than a first threshold, or the link quality corresponding to the candidate beam reference signal being greater than or equal to the first threshold.

In some embodiments, the first threshold is configured by a network device.

In some embodiments, a resource of the candidate beam reference signal corresponds to a set $\bar{q}_1$, and the set $\bar{q}_1$ includes a periodic CSI-RS resource.

In some embodiments, the candidate beam reference signal group is determined according to a configuration of a network device.

In some embodiments, the candidate beam reference signal group is determined according to an RRC parameter.

In some embodiments, the RRC parameter includes a candidate beam reference signal list.

In some embodiments, signal resources corresponding to the candidate beam reference signal group include periodic CSI-RS resources and/or SS/PBCH block resources.

In some embodiments, the terminal device further includes:

a communication module configured to report first information to a network device.

In some embodiments, the first information is transmitted through a PUCCH in a cell other than the first secondary cell.

In some embodiments, the first information is used to indicate a beam failure.

In some embodiments, the beam failure indicates that a link quality of at least one secondary cell satisfies a second condition.

In some embodiments, the second condition includes that a cumulative number of beam failure instances corresponding to the at least one secondary cell is greater than a second threshold, or the cumulative number of the beam failure instances corresponding to the at least one secondary cell is greater than or equal to the second threshold.

In some embodiments, the first information is transmitted by Media Access Control Control Element (MAC CE) in a cell other than the first secondary cell.

In some embodiments, the first information is used to indicate at least one of the following:

a beam failure, identity information of a cell where the beam failure occurs, and identity information of a candidate beam selected by the terminal device.

In some embodiments, the beam failure indicates that a link quality of at least one secondary cell satisfies a second condition.

In some embodiments, the second condition includes that a cumulative number of beam failure instances corresponding to the at least one secondary cell is greater than a first number threshold, or the cumulative number of beam failure instances corresponding to the at least one secondary cell is greater than or equal to the first number threshold.

In some embodiments, the cell other than the first secondary cell is a primary cell or a primary secondary cell.

In some embodiments, a part of the operation of the BFR is performed on the first secondary cell.

In some embodiments, a part of the operation of the BFR is performed on a cell other than the first secondary cell.

In some embodiments, the cell other than the first secondary cell is a primary cell or a primary secondary cell corresponding to the first secondary cell.

In some embodiments, the operation of the BFR is for an activate Bandwidth Part (BWP) of the first secondary cell.

In some embodiments, the processing module is further configured to:

activate the first secondary cell according to activation signaling from a network device.

In some embodiments, the activation signaling includes second BFR indication information, and the second BFR indication information is used to indicate that the activation signaling is further used to trigger starting or continuing of the operation of BFR corresponding to the first secondary cell.

It should be understood that the terminal device 600 according to the embodiments of the present disclosure may correspond to the terminal device in the method embodiments of the present disclosure, and the above and other operations and/or functions of each unit in the terminal device 600 are configured to implement corresponding processes performed by the terminal device in the method 300 shown in FIG. 3. For the sake of brevity, repeated descriptions are omitted here.

Figure 7:
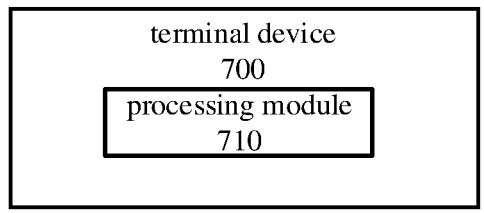
FIG. 7 is a schematic block diagram of a terminal device according to an embodiment of the present disclosure.

FIG. 7 is a schematic block diagram of a terminal device 700 according to an embodiment of the present disclosure. As shown in FIG. 7, the terminal device 700 includes a processing module 710.

The processing module 710 is configured to perform corresponding processing on a first secondary cell according to the execution status of Beam Failure Recovery (BFR) corresponding to the first secondary cell.

In some embodiments, the processing module 710 is configured to:

in response to failure of the BFR corresponding to the first secondary cell of the terminal device, deactivate the first secondary cell.

In some embodiments, the processing module 710 is further configured to:

determine that the BFR corresponding to the first secondary cell fails.

In some embodiments, the processing module 710 is configured to:

if a response of a network device for first information is not received within a first time period after the first information is reported to the network device, determine that the BFR corresponding to the first secondary cell fails.

In some embodiments, the first time period is preset or configured by the network device.

In some embodiments, the processing module 710 is configured to:

if first information is reported to a network device multiple times and a response of the network device for the first information is not received and the number of times the first information is reported reaches a first number threshold, determine that the BFR corresponding to the first secondary cell fails.

In some embodiments, the first number threshold is preconfigured or configured by the network device.

In some embodiments, if the first information is transmitted through a Media Access Control Control Element (MAC CE), the response of the network device for the first information includes an acknowledgement ACK signal of the network device for the MAC CE.

In some embodiments, the processing module 710 is further configured to:

if the terminal device reports first information to a network device through a MAC CE, and receives an acknowledgement ACK signal from the network device for the MAC CE, and does not receive a response of the network device for the first information within a second time period after the first information is reported, determine that the BFR corresponding to the first secondary cell fails.

In some embodiments, the second time period is preconfigured or configured by the network device.

In some embodiments, the processing module 710 is further configured to:

if the BFR corresponding to the first secondary cell is successful, restart a secondary cell deactivation timer corresponding to the first secondary cell.

In some embodiments, the processing module 710 is further configured to:

in response to reporting first information corresponding to the first secondary cell from to a network device, restart a secondary cell deactivation timer corresponding to the first secondary cell.

In some embodiments, the first information is transmitted through PUCCH and/or MAC CE.

In some embodiments, if the first information is transmitted through the PUCCH, the first information is used to indicate a beam failure.

In some embodiments, if the first information is transmitted through the MAC CE, the first information is used to indicate at least one of the following: a beam failure, identity information of a cell where the beam failure occurs, and identity information of a candidate beam selected by the terminal device.

In some embodiments, the beam failure is used to indicate that a link quality of at least one secondary cell satisfies a second condition.

In some embodiments, the second condition includes that a cumulative number of beam failure instances corresponding to the at least one secondary cell is greater than a first number threshold, or the cumulative number of beam failure instances corresponding to the at least one secondary cell is greater than or equal to the first number threshold.

It should be understood that the terminal device 700 according to the embodiments of the present disclosure may correspond to the terminal device in the method embodiments of the present disclosure, and the above and other operations and/or functions of each unit in the terminal device 700 are configured to implement corresponding processes performed by the terminal device in the method 400 shown in FIG. 4. For the sake of brevity, repeated descriptions are omitted here.

Figure 8:
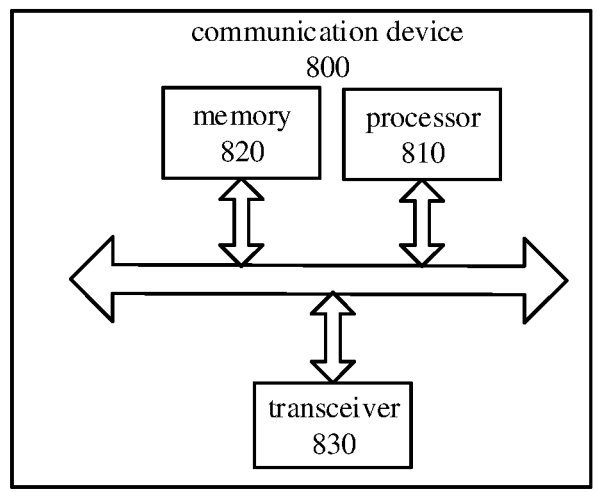
FIG. 8 is a schematic block diagram of a communication device according to an embodiment of the present disclosure.

FIG. 8 is a schematic structural diagram of a communication device 800 according to an embodiment of the present disclosure. The communication device 800 shown in FIG. 8 includes a processor 810, and the processor 810 may call and run a computer program from a memory to perform the method in embodiments of the present disclosure.

According to embodiments, as shown in FIG. 8, the communication device 800 may further include a memory 820. The processor 810 may call and run a computer program from the memory 820 to perform the method in embodiments of the present disclosure.

The memory 820 may be a separate device independent of the processor 810, or may be integrated in the processor 810.

According to embodiments, as shown in FIG. 8, the communication device 800 may further include a transceiver 830, and the processor 810 may control the transceiver 830 to communicate with other devices. Specifically, the transceiver may send information or data to other devices, or receive information or data sent by other devices.

The transceiver 830 may include a transmitter and a receiver. The transceiver 630 may further include one or more antennas.

According to embodiments, the communication device 800 may specifically be the mobile terminal/terminal device according to an embodiment of the present disclosure, and the communication device 800 may implement the corresponding processes implemented by the mobile terminal/terminal device in the method embodiments of the present disclosure.

Figure 9:
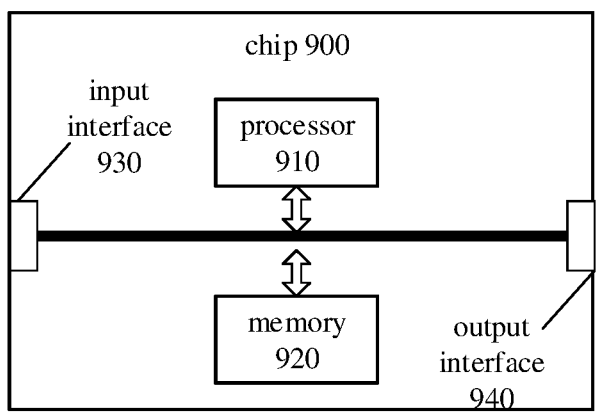
FIG. 9 is a schematic block diagram of a chip according to an embodiment of the present disclosure.

FIG. 9 is a schematic structural diagram of a chip according to an embodiment of the present disclosure. The chip 900 shown in FIG. 9 includes a processor 910, and the processor 910 can call and run a computer program from a memory to implement the method according to embodiments of the present disclosure.

According to embodiments, as shown in FIG. 9, the chip 900 may further include a memory 920. The processor 910 may call and run a computer program from the memory 920 to implement the method according to embodiments of the present disclosure.

The memory 920 may be a separate device independent of the processor 910, or may be integrated in the processor 910.

According to embodiments, the chip 900 may further include an input interface 930. The processor 910 may control the input interface 930 to communicate with other devices or chips, and specifically, the processor 910 can control the input interface to obtain information or data sent by other devices or chips.

According to embodiments, the chip 900 may further include an output interface 940. The processor 910 can control the output interface 940 to communicate with other devices or chips, and specifically, the processor 910 can control the output interface 940 to output information or data to other devices or chips.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
    canceling or suspending, by a terminal device, an operation of Beam Failure Recovery (BFR) corresponding to a first secondary cell in response to deactivation of the first secondary cell;
    wherein canceling or suspending, by the terminal device, the operation of BFR corresponding to the first secondary cell comprises:
    stopping, by the terminal device, monitoring of a response of a network device for first information reported by the terminal device;
    wherein the first information is transmitted by Media Access Control Control Element (MAC CE);
    wherein the first information is used to indicate at least one of the following:
    a beam failure, identity information of a cell where the beam failure occurs, or identity information of a candidate beam selected by the terminal device;
    wherein the beam failure indicates that a link quality of at least one secondary cell satisfies a second condition.

2. The wireless communication method according to claim 1, further comprising:
    deactivating, by the terminal device, the first secondary cell according to deactivation signaling from a network device or a deactivation timer for the first secondary cell.

3. The wireless communication method according to claim 1, wherein canceling or suspending, by the terminal device, the operation of BFR corresponding to the first secondary cell further comprises:
    at a physical layer, stopping, by the terminal device, measuring a beam failure detection reference signal resource corresponding to the first secondary cell.

4. The wireless communication method according to claim 3, further comprising:
    at a Media Access Control (MAC) layer, notifying by the terminal device the physical layer to stop measuring the beam failure detection reference signal resource.

5. The wireless communication method according to claim 1, wherein canceling or suspending, by the terminal device, the operation of BFR corresponding to the first secondary cell further comprises at least one of:

at a physical layer, stopping by the terminal device, reporting a measurement status of a beam failure detection reference signal resource corresponding to the first secondary cell to a Media Access Control (MAC) layer; or at the MAC layer, stopping by the terminal device, receiving the measurement status of the beam failure detection reference signal resource corresponding to the first secondary cell reported by the physical layer.

6. The wireless communication method according to claim 1, wherein canceling or suspending, by a terminal device, the operation of BFR corresponding to the first secondary cell further comprises:

suspending or resetting, by the terminal device, counting of beam failure instances corresponding to the first secondary cell.

7. The wireless communication method according to claim 6, wherein resetting the counting of the beam failure instances comprises: setting a count value of the beam failure instances to zero.

8. The wireless communication method according to claim 1, wherein the second condition comprises that a cumulative number of beam failure instances corresponding to the at least one secondary cell is greater than a first number threshold, or the cumulative number of beam failure instances corresponding to the at least one secondary cell is greater than or equal to the first number threshold.

9. A terminal device, comprising one or more processors, memory storing a plurality of programs that, when executed by the one or more processors, cause the terminal device to:

cancel or suspend an operation of Beam Failure Recovery (BFR) corresponding to a first secondary cell in response to deactivation of the first secondary cell;

when the plurality of programs are executed by the one or more processors, the terminal device is caused to:

stop monitoring of a response of a network device for first information reported by the terminal device;

wherein the first information is transmitted by Media Access Control Control Element (MAC CE);

wherein the first information is used to indicate at least one of the following:

a beam failure, identity information of a cell where the beam failure occurs, or identity information of a candidate beam selected by the terminal device;

wherein the beam failure indicates that a link quality of at least one secondary cell satisfies a second condition.

10. The terminal device according to claim 9, wherein when the plurality of programs are executed by the one or more processors, the terminal device is caused to:

deactivate the first secondary cell according to deactivation signaling from a network device or a deactivation timer for the first secondary cell.

11. The terminal device according to claim 9, wherein when the plurality of programs are executed by the one or more processors, the terminal device is further caused to:

at a physical layer, stop measuring a beam failure detection reference signal resource corresponding to the first secondary cell.

12. The terminal device according to claim 11, wherein when the plurality of programs are executed by the one or more processors, the terminal device is further caused to:

at a Media Access Control (MAC) layer, notify the physical layer to stop measuring the beam failure detection reference signal resource.

13. The terminal device according to claim 9, wherein when the plurality of programs are executed by the one or more processors, the terminal device is further caused to perform at least one of:

at a physical layer, stopping reporting a measurement status of a beam failure detection reference signal resource corresponding to the first secondary cell to a Media Access Control (MAC) layer; or at the MAC layer, stopping receiving the measurement status of the beam failure detection reference signal resource corresponding to the first secondary cell reported by the physical layer.

14. The terminal device according to claim 13, wherein when the plurality of programs are executed by the one or more processors, the terminal device is further caused to:

suspend or reset counting of beam failure instances corresponding to the first secondary cell.

15. The terminal device according to claim 14, wherein resetting the counting of the beam failure instances comprises: setting a count value of the beam failure instances to zero.

* * * * *